(12) United States Patent
Metoh et al.

(10) Patent No.: US 8,776,918 B2
(45) Date of Patent: Jul. 15, 2014

(54) INVERTED PENDULUM TYPE VEHICLE

(71) Applicant: Honda Motor Co., Ltd., Tokyo (JP)

(72) Inventors: Yusuke Metoh, Saitama (JP); Sora Kawaida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/801,301

(22) Filed: Mar. 13, 2013

(65) Prior Publication Data

US 2013/0299254 A1 Nov. 14, 2013

(30) Foreign Application Priority Data

May 14, 2012 (JP) ................... 2012-111061

(51) Int. Cl.
*B62K 3/00* (2006.01)
*B62D 61/02* (2006.01)
*B62K 1/00* (2006.01)
*B62D 61/00* (2006.01)

(52) U.S. Cl.
CPC ................. *B62K 3/007* (2013.01); *B62D 61/00* (2013.01); *B62K 1/00* (2013.01)
USPC .............................................. 180/21; 476/68

(58) Field of Classification Search
CPC ............ B60K 1/04; B60K 1/00; B60K 15/00; B60K 11/00; B60B 19/003; B60B 19/125; B62D 61/00; F16H 13/08
USPC ................ 180/21, 208, 220; 476/68
See application file for complete search history.

(56) References Cited

U.S. PATENT DOCUMENTS

| 2011/0070998 | A1* | 3/2011 | Takenaka et al. | 476/68 |
| 2012/0175175 | A1* | 7/2012 | Gomi et al. | 180/21 |
| 2013/0299254 | A1* | 11/2013 | MUTOH et al. | 180/21 |
| 2013/0299259 | A1* | 11/2013 | MUTO et al. | 180/220 |
| 2013/0299260 | A1* | 11/2013 | SHIMIZU et al. | 180/220 |
| 2013/0299261 | A1* | 11/2013 | MUTO et al. | 180/220 |
| 2013/0299262 | A1* | 11/2013 | MUTO et al. | 180/220 |
| 2013/0299263 | A1* | 11/2013 | SHIMIZU et al. | 180/220 |

FOREIGN PATENT DOCUMENTS

JP 2011-063242 A 3/2011

* cited by examiner

*Primary Examiner* — Karen Beck
(74) *Attorney, Agent, or Firm* — Carrier Blackman & Associates, P.C.; Joseph P. Carrier; Jeffrey T. Gedeon

(57) ABSTRACT

An inverted pendulum type vehicle (1) includes a propulsion unit (50) provided in a lower part of a vehicle body to actuate a main wheel (52), a drive unit (90, 130) provided in a vertically intermediate part thereof and a seat (200) provided in an upper part of the vehicle body. A battery case (251) is mounted in a part of the vehicle body above the main wheel and behind the drive unit. The battery case is provided with an opening (257) extending from an upper part thereof to a lower end of a rear part thereof. A lid (260) hinged to the battery case selectively covers the upper end of a battery (250) received in the battery case. The battery is retained in the battery case with the help of suitable engagement arrangements (262, 263, 270, 271, 273, 274).

9 Claims, 19 Drawing Sheets

INVERTED PENDULUM TYPE VEHICLE

TECHNICAL FIELD

The present invention relates to an inverted pendulum type vehicle, and in particular to an inverted pendulum type vehicle having an improved battery mounting structure.

BACKGROUND ART

An inverted pendulum type vehicle is known from JP 2011-63242. This vehicle comprises a vehicle body frame, a main wheel including a plurality of freely rotatable driven rollers combined into an annular arrangement such that the driven rollers are individually rotatable around the annular axial line or the tangential line of the annular axial line at the point where the particular driven roller is located, a pair of drive disks located on either side of the main wheel in a substantially coaxial relationship and each provided with a plurality of circumferentially arranged drive rollers so as to engage the driven rollers in a skewed relationship, and electric motors that are configured to drive the drive disks individually.

PRIOR ART DOCUMENT(S)

Patent Document(s)

This inverted pendulum type vehicle includes a vehicle body frame having an outer shell structure, and made of fiber reinforced plastic material. This vehicle body frame is divided into an upper frame and a lower frame, and a battery is received inside the upper frame. Therefore, when the battery is required to be changed or otherwise accessed, the interior of the upper frame must be exposed, and this requires a considerable time and effort.

SUMMARY OF THE INVENTION

In view of such a problem of the prior art, a primary object of the present invention is to provide an inverted pendulum type vehicle which allows a battery thereof to be replaced both easily and quickly.

To achieve such an object, the present invention provides an inverted pendulum type vehicle, comprising: a vehicle body frame extending in a vertical direction; a propulsion unit mounted in a lower part of the vehicle body frame and including a main wheel configured to be actuated by an inverted pendulum control; a drive unit mounted in a vertically intermediate part of the vehicle body and configured to actuate the main wheel; a seat mounted on an upper part of the vehicle body frame; a battery case mounted on the vehicle frame behind the drive unit, and having an access opening extending at least in an upper end thereof; a battery configured to be received in the battery case; and a lid pivotally supported by the battery case so as to be moveable between an open position exposing the access opening and a closed position closing at least an upper part of the access opening and engaging a part of the battery.

Because the access opening of the battery is exposed to the outside of the vehicle, the access to the battery is facilitated. The main wheel is relatively elongated in the fore and aft direction while the drive unit is substantially less elongated in the fore and aft direction than the main wheel so that the space created behind the drive unit and above the main wheel which is otherwise wasted can be conveniently utilized for stowing the battery. This position also causes no interference with the driving of the vehicle by the rider. Further, the battery is placed in a relatively upper part of the vehicle, and this is advantageous for the inverted pendulum control.

According to a second aspect of the present invention, the battery case includes an engagement portion provided in a bottom wall thereof and a bottom end of the battery includes a corresponding engagement portion configured to cooperate with the engagement portion of the battery case whereby the battery is prevented from lateral movement. According to a particularly preferred embodiment of the present invention, one of the engagement portions comprises a recess and the other of the engagement portions comprises a projection configured to be fitted into the recess when the battery is placed in the battery case.

The engagement between the two engagement portions prevents the lateral movement of the lower part of the battery, and this contributes to the stable retaining of the battery. In particular, when removing the battery, the upper part of the battery may be pulled rearward so as to cause the pivoting movement of the battery around the bottom end thereof so that the removal of the battery may be facilitated even when the weight of the battery is significant.

According to a third aspect of the present invention, the lid includes an engagement portion provided in an inner surface thereof and a top end of the battery includes a corresponding engagement portion configured to cooperate with the engagement portion of the lid when the lid is in the closed position whereby the battery is prevented from lateral movement. According to a particularly preferred embodiment of the present invention, one of the engagement portions comprises a recess and the other of the engagement portions comprises a projection configured to be fitted into the recess when the battery is placed in the battery case and the lid is in the closed position.

According to this arrangement, the upper part of the battery can be held in a stable manner when the lid is closed, and the battery can be easily removed when the lid is opened. When the lid is provided with a latch that cooperates with a corresponding latch catch provided in an upper end of the battery for selectively holding the lid in the closed position, a particularly convenient and stable retention of the battery can be achieved. Typically, the lid is connected to an upper part of the battery case adjacent to a forward end of the opening thereof via a hinge having a hinge axis extending in a lateral direction.

According to a fourth aspect of the present invention, the access opening extends from the upper end of the battery case to at least a vertically middle part of a rear end of the battery case.

Thereby, the upper part of the battery is conspicuously exposed so that the placing and removing the battery into and out of the battery case is facilitated. The access opening may extend from the upper end of the battery case to a lower part of the rear end of the battery case if a suitable arrangement is made to retain the battery within the battery case.

According to a fifth aspect of the present invention, the battery case is configured such that the battery is tilted rearward when the battery is fully received in the battery case. Thereby, when removing the battery, the battery falls under its own weight onto the hand of the person trying to remove the batter, and this facilitates the removal of the battery from the battery case. This is particularly the case when the battery is vertically elongated.

According to a sixth aspect of the present invention, the seat is moveable between a lower operating position and an upper non-operating position, and the seat is located so as to prevent the lid from moving from the closed position when the seat is in the lower operating position and allow the lid to move to the open position when the seat is in the upper non-operating position Thereby, an inadvertent removal of the battery is avoided when the seat in the operational position while an easy access is afforded when the seat is put into the non-operational position. The movement of the seat between the lower operational position and the upper non-operational position may be effected by using a mechanism for adjusting the height of the seat according to the build and preference of the rider.

BRIEF DESCRIPTION OF THE SEVERAL VIEWS OF DRAWINGS

Now the present invention is described in the following with reference to the appended drawings, in which.

DETAILED DESCRIPTION OF THE PREFERRED EMBODIMENT(S)

Figure 1:
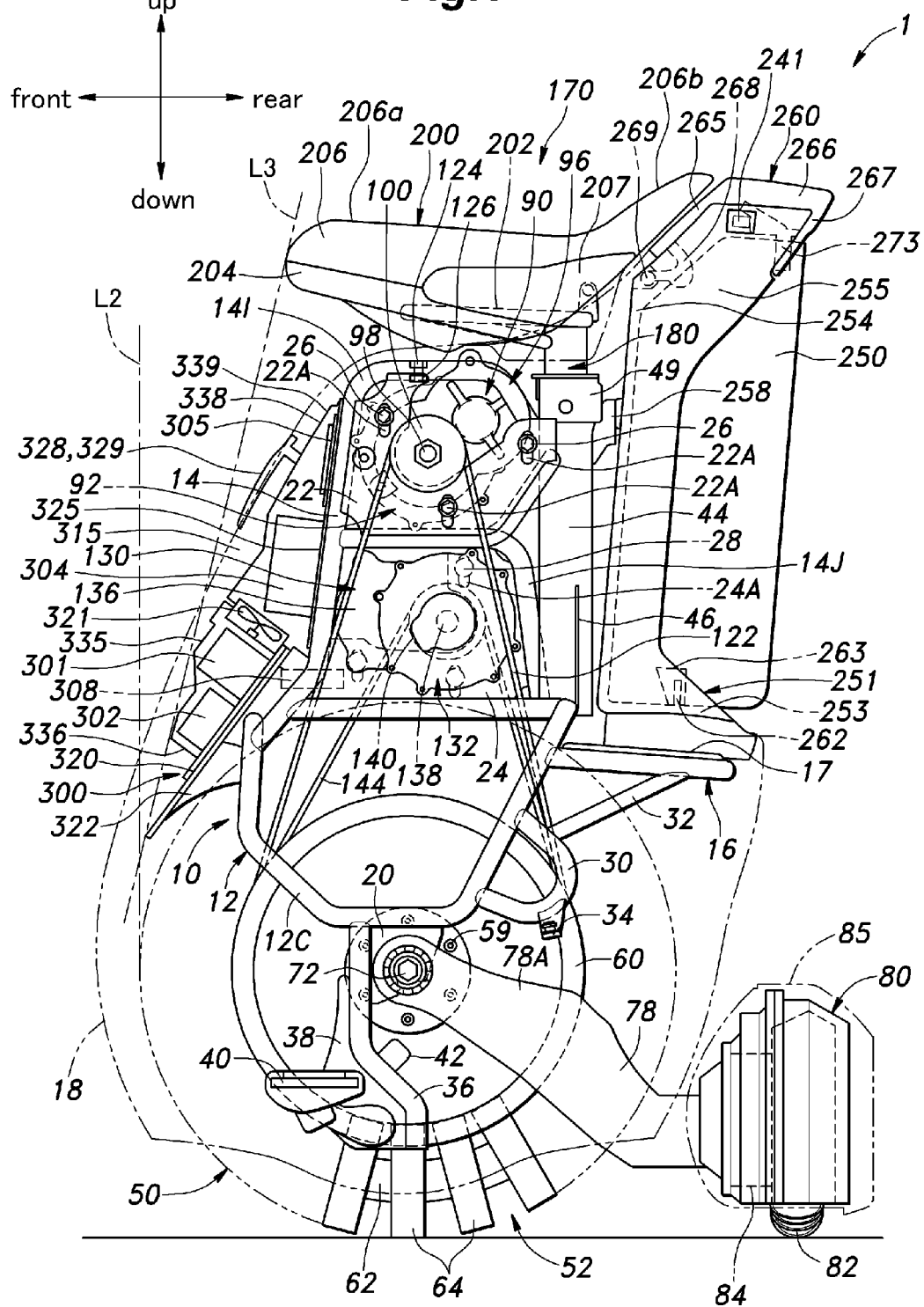
FIG. 1 is a side view of an inverted pendulum type vehicle embodying the present invention.

The orientation or the direction used in the following description is defined as viewed from the position of the user riding the vehicle. An inverted pendulum type vehicle 1 illustrated in FIGS. 1 to 3 comprises a body frame 10 consisting of a skeletal frame, a propulsion unit 50 provided in a lower part of the body frame 10 and including a main wheel (road wheel) 52, a left drive unit 90 and a right drive unit 130 configured to jointly actuate the propulsion unit 50, an electric unit 300 for controlling and powering the left and right drive units 90 and 130, a battery pack 250 providing electric power to the electric unit 300 and a seat unit 170 provided in an upper end of the body frame 10 to support a rider.

Figure 4:
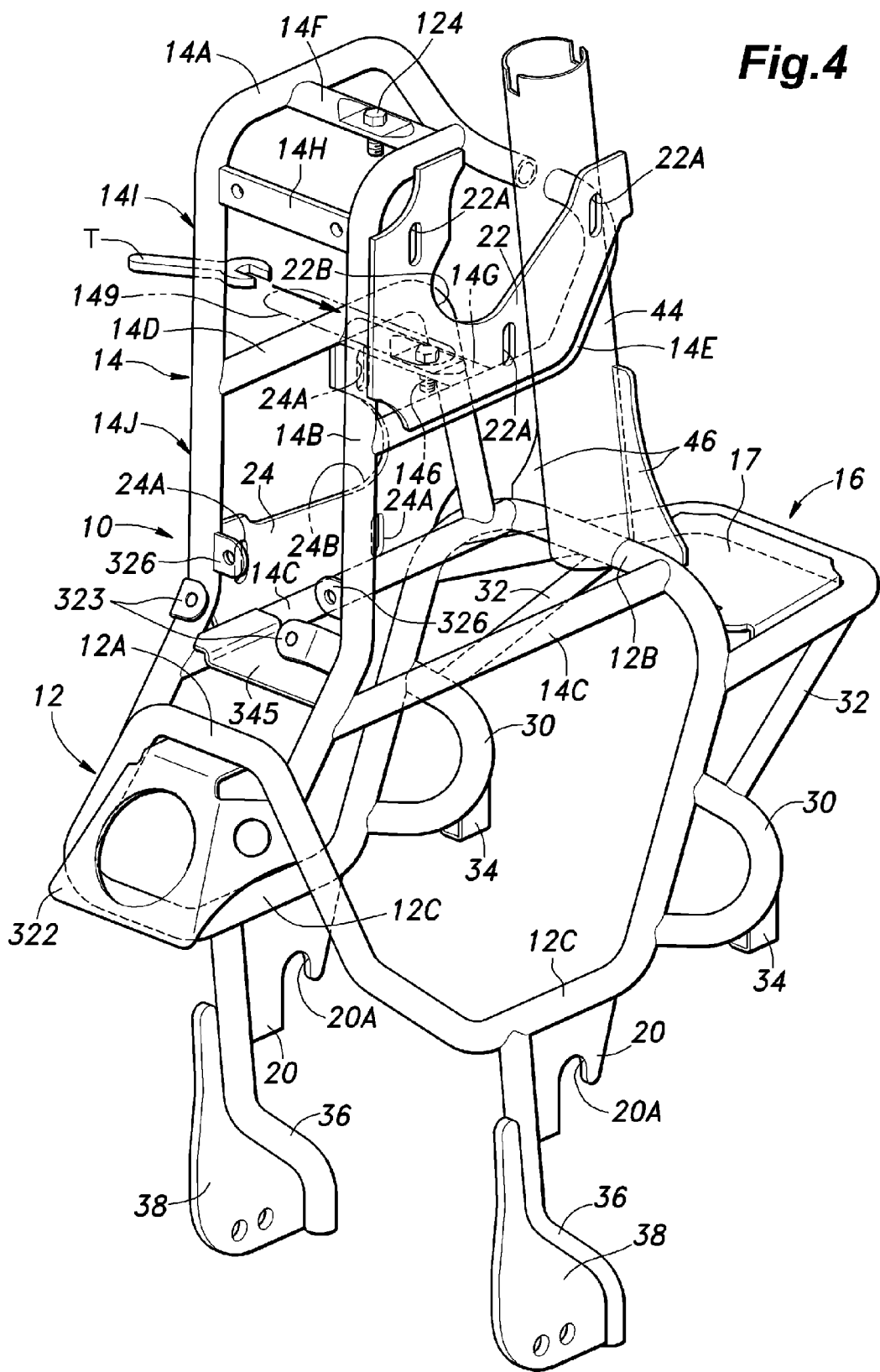
FIG. 4 is a perspective view of a vehicle body frame of the inverted pendulum type vehicle.

The body frame 10 is formed by bending and welding pipe members as best illustrated in FIG. 4. Each pipe member typically consists of metallic material such as steel and aluminum, and may have a circular cross section. The body frame 10 includes a propulsion unit support portion 12 in a lower part thereof, a drive unit support portion 14 located above the propulsion unit support portion 12 and a battery support portion 16 located behind the drive unit support portion 14.

The propulsion unit support portion 12 includes an inverted U-shaped front pipe member 12A, a pair of lower side pipe members 12C extending rearward from the lower side ends of the front pipe member 12A and an inverted U-shaped rear pipe member 12B having lower ends connected to the corresponding rear ends of the lower side pipe members 12C. A step support pipe member 36 depends from a lower side of each lower side pipe member 12C, and a step mounting plate 38 having a major plane extending perpendicularly to the lateral direction is welded to the front side of the step support pipe member 36. A step 40 is fixedly attached to an outer side of each step mounting plate 38 for supporting a foot of the rider.

An axle support plate 20 extending perpendicularly to the lateral direction is welded to a lower side of the lower end of each lower side pipe member 12C and a rear side of the corresponding step support pipe member 36 so as to fill the corner defined by the two pipe members 12C and 36. Each axle support plate 20 is provided with a bearing cutout 20A on a lower edge thereof.

The drive unit support portion 14 includes a right front pipe member 14A extending vertically and having a lower end welded to an upper right side part of the front pipe member 12A and an upper end bent rearward substantially at a right angle, and a left front pipe member 13B extending vertically and having a lower end welded to an upper left side part of the front pipe member 12A and an upper end bent rearward substantially at a right angle. The upper rear end of the left front pipe member 13B extends only half as much as that of the right front pipe member 13A, and an upper lateral pipe member 14F extends laterally between the upper rear end of the left front pipe member 13B and an intermediate point of the upper rear end of the right front pipe member 14A.

A fore and aft pipe member 14C extends rearward from a lower end part of the right front pipe member 14A which slightly tilts rearward, and is connected to an upper part of the inverted U-shaped rear pipe member 12B. A similar fore and aft pipe member 14C extends rearward from a lower end part of the left front pipe member 14B which is also tilted rearward, and is connected to an upper part of the inverted U-shaped rear pipe member 12B. The two fore and aft pipe membered 14C extend in parallel to each other. A right branch pipe member 14D extends rearward from a vertically intermediate part of the right front pipe member 14A substantially horizontally. The rear end of the right branch pipe member 14D is bent downward, and is connected to a rear end part of the right fore and aft pipe member 14C. A left branch pipe member 14E extends rearward from a vertically intermediate part of the left front pipe member 14B substantially horizontally, and is tilted upward in a rear end pipe thereof. The rear end of the left branch pipe member 14E is bent laterally toward the rear end of the right front pipe member 14A to be connected thereto. An intermediate point of the right branch pipe member 14D and an intermediate point of the left branch pipe member 14E are connected to each other by a lower lateral pipe member 14G extending substantially horizontally. Further, a connecting plate 14H is welded between the upper ends of the vertical sections of the right and left front pipe members 14A and 14B.

The drive unit support portion 14 thus defines an upper cage 14I and a lower cage 14J, each defining a substantially rectangular cuboid shape, which are separated by the lower lateral pipe member 14G. The left side of the upper cage 14I is partly closed by a left drive unit mounting plate 22 which is attached to the left branch pipe member 14E and the upper part of the left front pipe member 14B in the manner of a gusset plate. The right side of the lower cage 14J is partly closed by a right drive unit mounting plate 24 which is attached to the lower part of the right front pipe member 14A, the right fore and aft pipe member 14C and the rear end part of the right branch pipe member 14D in the manner of a gusset plate. The left drive unit mounting plate 22 and the right drive unit mounting plate 24 extend in parallel to each other and vertically offset from each other.

The body frame 10 includes a center post 44 extending vertically between the drive unit support portion 14 and the battery support portion 16, and having a lower end connected to the upper end of the propulsion unit support portion 12 and an upper end terminating at a substantially same elevation as the upper end of the drive unit support portion 14. The center post 44 has a substantially larger diameter than that of the remaining pipe members of the body frame 10. The lower end of the center post 44 is provided with a pair of semicircular cutouts on either side thereof which snugly receive the laterally extending upper part of the rear pipe member 12B, and is welded thereto with a pair of triangular gussets 46 placed in the corners defined between the two members for reinforcement.

In the illustrated embodiment, the rear ends of the right front pipe member 14A and the left branch pipe member 14E are connected to each other via the center post 44. More specifically, the corresponding end of the right front pipe member 14A is welded to a right side of the center post 44 and the corresponding end of the left branch pipe member 14E is welded to a left side of the center post 44 such that the two pipe members are aligned with each other without protruding into the interior of the center post 44.

The battery support portion 16 comprises a rectangular C-shaped pipe member 16A extending along a substantially horizontal plane, and having two ends welded to side parts of the rear pipe member 12B of the propulsion unit support portion 12, respectively, and a middle part extending laterally. A shelf plate 17 is welded to the C-shaped pipe member 16A so as to define a substantially horizontal supporting surface extending rearward from the rear end of the propulsion unit support portion 12. A U-shaped reinforcing pipe member 30 is attached to the rear side of the substantially vertical section of the rear part of each lower side pipe member 12C, and a linear brace pipe member 32 extends between the U-shaped reinforcing pipe member 30 and a suitable point on the C-shaped pipe member 16A.

The vehicle body frame 10 including the propulsion unit support portion 12, the drive unit support portion 14 and the battery support portion 16 is covered by an outer shell 18 made of plastic material as indicated by the imaginary lines in FIG. 1.

<Propulsion Unit>

Figure 7:
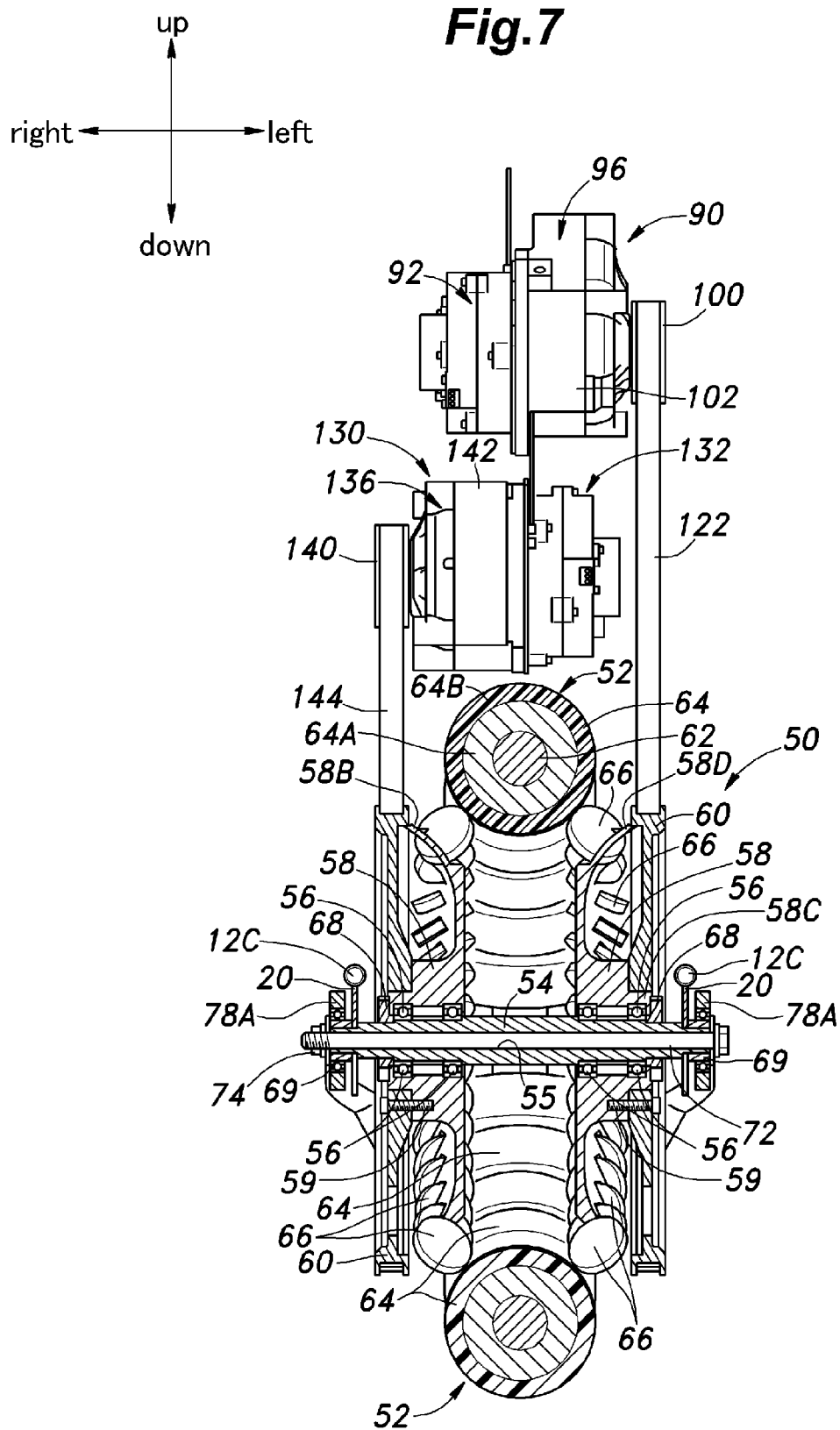
FIG. 7 is a front view of the drive units and the propulsion unit of the inverted pendulum type vehicle with the propulsion unit shown in section.
Figure 8:
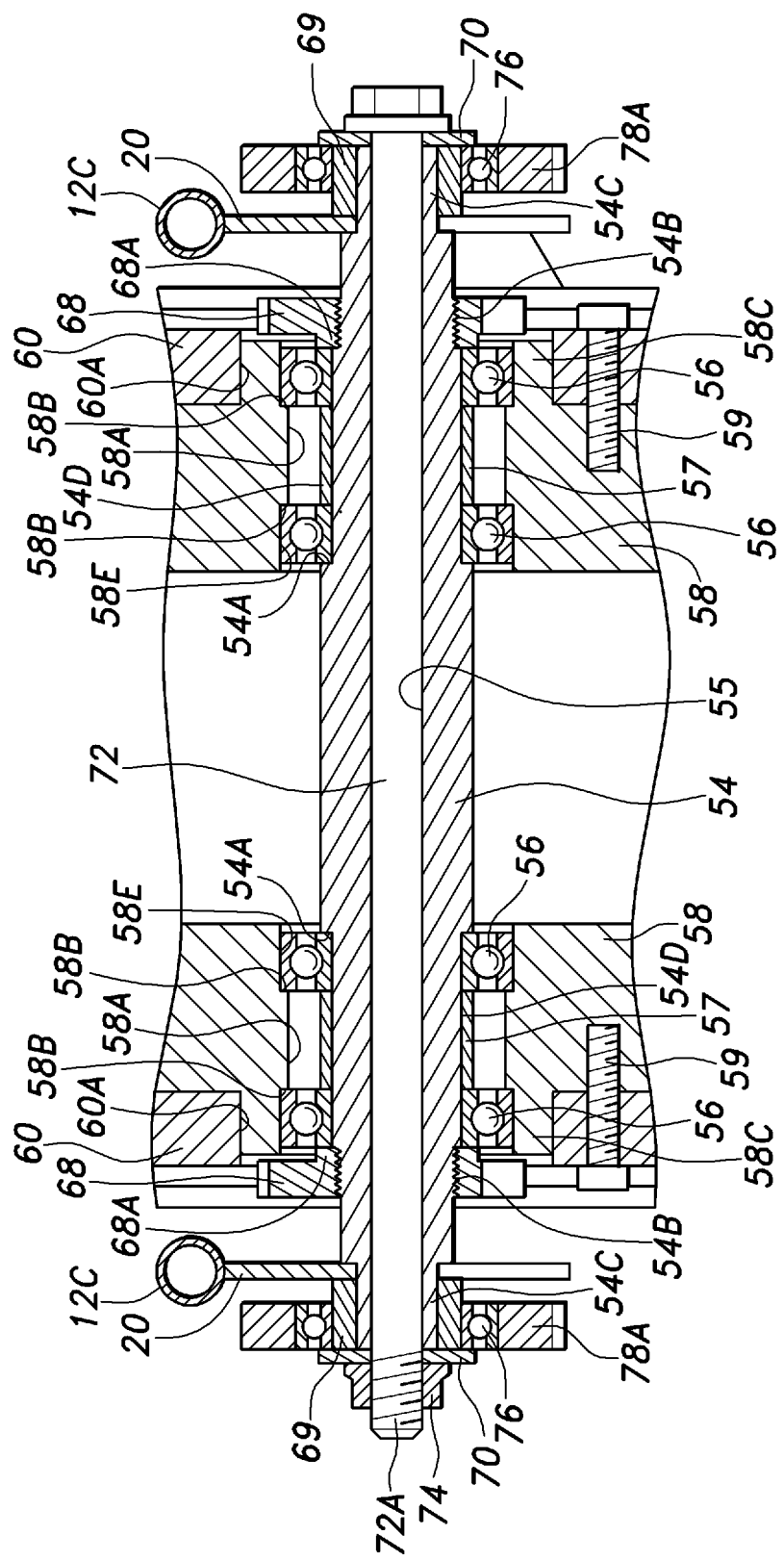
FIG. 8 is a fragmentary sectional view of an axle structure of the propulsion unit of the inverted pendulum type vehicle.

The propulsion unit 50 is located between the two side pipe members 12C of the propulsion unit support portion 12. As shown in FIGS. 1 to 3, 6 and 7, the propulsion unit 50 comprises a hollow axle shaft 54 extending laterally and horizontally, a pair of drive disks 58 rotatably fitted on the hollow axle shaft 54 in an independently freely rotatable manner, a main wheel 52 disposed around the hollow axle shaft 54 between the two drive disks 58 in a freely rotatable manner, and a pair of driven pulleys 66 fixedly attached to the outer sides of the two drive disks 58, respectively, by using threaded bolts 59, all in a coaxial relationship to the hollow axle shaft 54. As shown in FIG. 8, each drive disk 58 is centrally provided with an annular boss 58C that fits into a central opening formed in the corresponding driven pulley 60.

The main wheel 50 consists of a road wheel which is actuated according to the principle of the inverted pendulum control. As shown in FIG. 7, the main wheel comprises a metallic annular member 62 and a plurality of driven rollers (free rollers) 64 rotatably fitted on the annular member 62, and engages the road surface via the driven rollers 64. Each driven roller 64 comprises a metallic base part 64A having a cylindrical shape rotatably fitted on the annular member 62 and an outer peripheral part 64B made of rubber and vulcanized onto the outer peripheral surface of the metallic base part 64A. The driven rollers 64 are thus arranged circumferentially along the annular member 62, and are each rotatable around an annular axial line or the tangential line of the annular member 52 at the point where the incident driven roller 64 is located. In other words, the main wheel 52 is formed as a combination of a plurality of driven rollers 64 arranged in an annular shape each in an independently rotatable manner. More precisely, the driven rollers 64 forms the main wheel 52 by being arranged into a polygon having the same number of sides as the number of the driven rollers 64.

Each drive disk 58 consists of a disk member having a smaller outer diameter than the central diameter of the annular member 62, and defines a frusto-conical outer peripheral surface 58D which rotatable supports a plurality of freely rotatable drive rollers 66 arranged at a regular interval in the circumferential direction. The drive disks 58 are arranged in a symmetric manner such that the small diameter end of the frusto-conical outer peripheral surface 58D of one of the drive disks 58 opposes the counterpart of the other drive disk 58, and the drive rollers 66 of one of the drive disks 58 are symmetric to the counterparts of the other drive disk 58. The rotational center lines of the drive rollers 66 of each drive disk 58 are arranged in a skewed relationship to the rotational center line of the drive disk 58. Therefore, the drive rollers 66 of each drive disk 58 are arranged in a similar fashion as the teeth of a helical bevel gear.

The hollow axle shaft 54 supports the right and left drive disks 58 via respective ball bearings (radial ball bearings) 56 in an independently rotatable manner. The two ball bearings 56 are fitted on a reduced diameter portion 54D of the hollow axle shaft 54 in an axially spaced apart relationship. A collar member 57 is fitted on the outer periphery of the reduced diameter portion 54D of the hollow axle shaft 54 between the two ball bearings 56 so as to define the space between the inner races of the two ball bearings 56. The inner race of the inner one of the two ball bearings 56 on each side abuts an annular shoulder 54A defined between the main part of the hollow axle shaft 54 and the corresponding reduced diameter portion 54D.

As shown FIG. 8, each drive disk 58 is formed with a central through hole 58A which includes an enlarged diameter portion 58E at each of the two axially outer ends thereof. The outer race of each bearing 56 is fitted into the corresponding enlarged diameter portion 58E of each central through hole 58A.

Thus, the two ball bearings 56 of each drive disk 58 are axially positioned to each other by interposing the collar members 57 between the inner races of the two ball bearings 56 on the one hand, and abutting the axially inner end face of the outer race of each ball bearing 56 against the corresponding annular shoulder surface 58B defined by the corresponding enlarged diameter portion 58E on the other hand. Accordingly, the axial length of the collar member 57 is equal to the axial space between the annular shoulder surfaces 58B defined by the reduced diameter portions 58E of each drive disk 58.

The parts of the hollow axle shaft 54 immediately outside of the two outer roller bearings 56 are each formed with a screw thread 54B on which a nut 68 is threadably engaged. By fastening each nut 68, an annular central boss 68A formed in the opposing face of the nut 68 is caused to push against the end surface of the inner race of the corresponding outer ball bearing 56. As a result, the inner races of the two ball bearings 56 for each drive disk 58, along with the collar member 57 interposed between them, are firmly interposed between the corresponding positioning annular shoulder 54A and the nut 68 such that the drive disk 58 is axially positioned on the hollow axle shaft 54. As a result, each drive disk 58 is allowed to be rotatable supported with very little frictional resistance.

The outer diameter (flange outer diameter) of each nut 68 is greater than the outer diameter of the outer race of the corresponding ball bearing 56. In particular, the outer diameter of the nut 68 is greater than the inner diameter of the central through hole 58A of the corresponding drive disk 58. Thereby, the nut 56 provides a labyrinth seal for preventing the intrusion of foreign matters into the area where the corresponding ball bearings 56 are located.

The inner diameter of the central through hole 60A of each driven pulley 60 is greater than the outer diameter of the nut 68 so that the nut 68 can be axially passed through the central through hole 60A. Therefore, the driven pulley 60 can be removed from and attached to the drive disk 58 with the nut 68 kept fastened to the hollow axle shaft 54.

Figure 2:
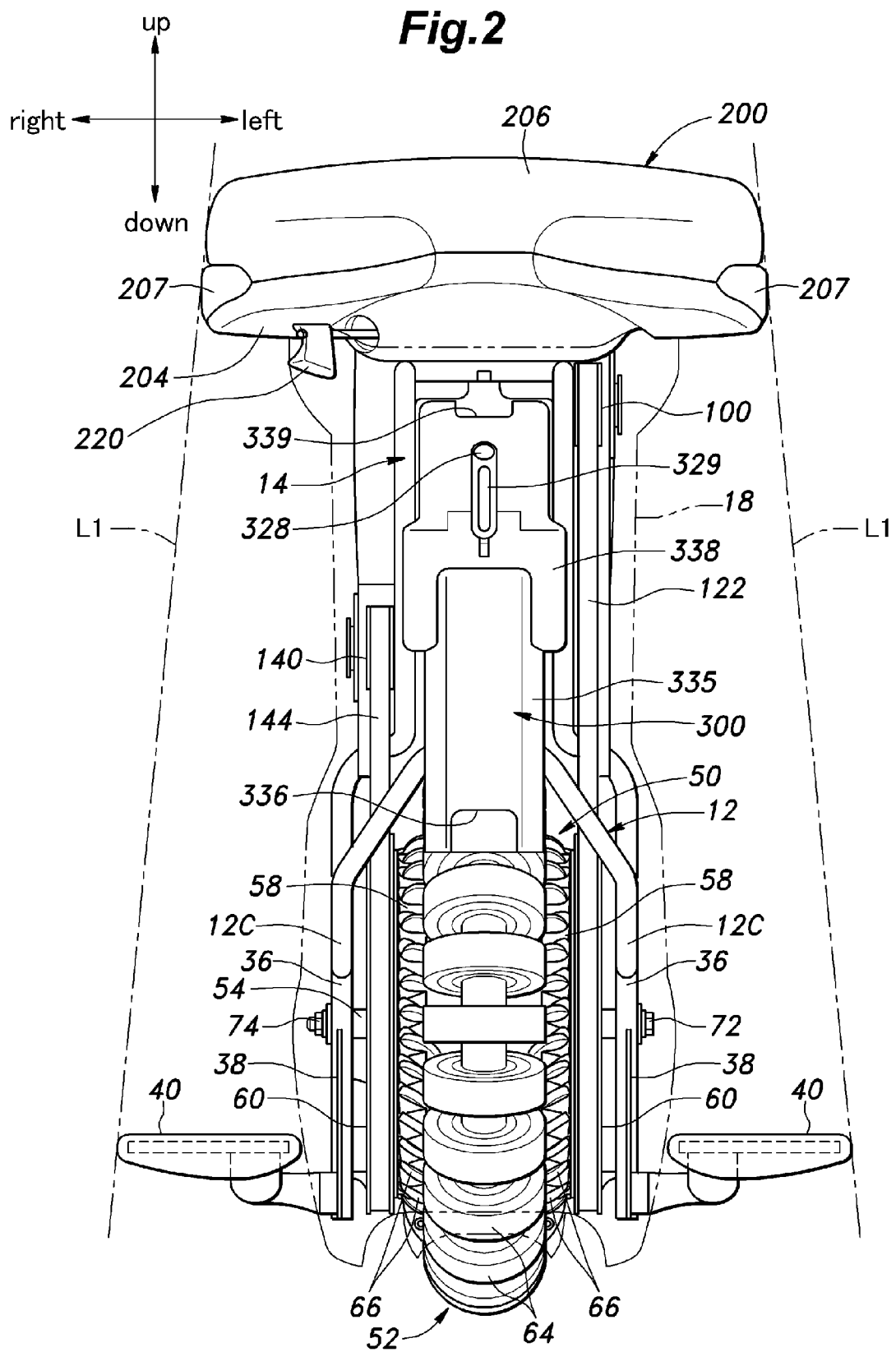
FIG. 2 is a front view of the inverted pendulum type vehicle.
Figure 6:
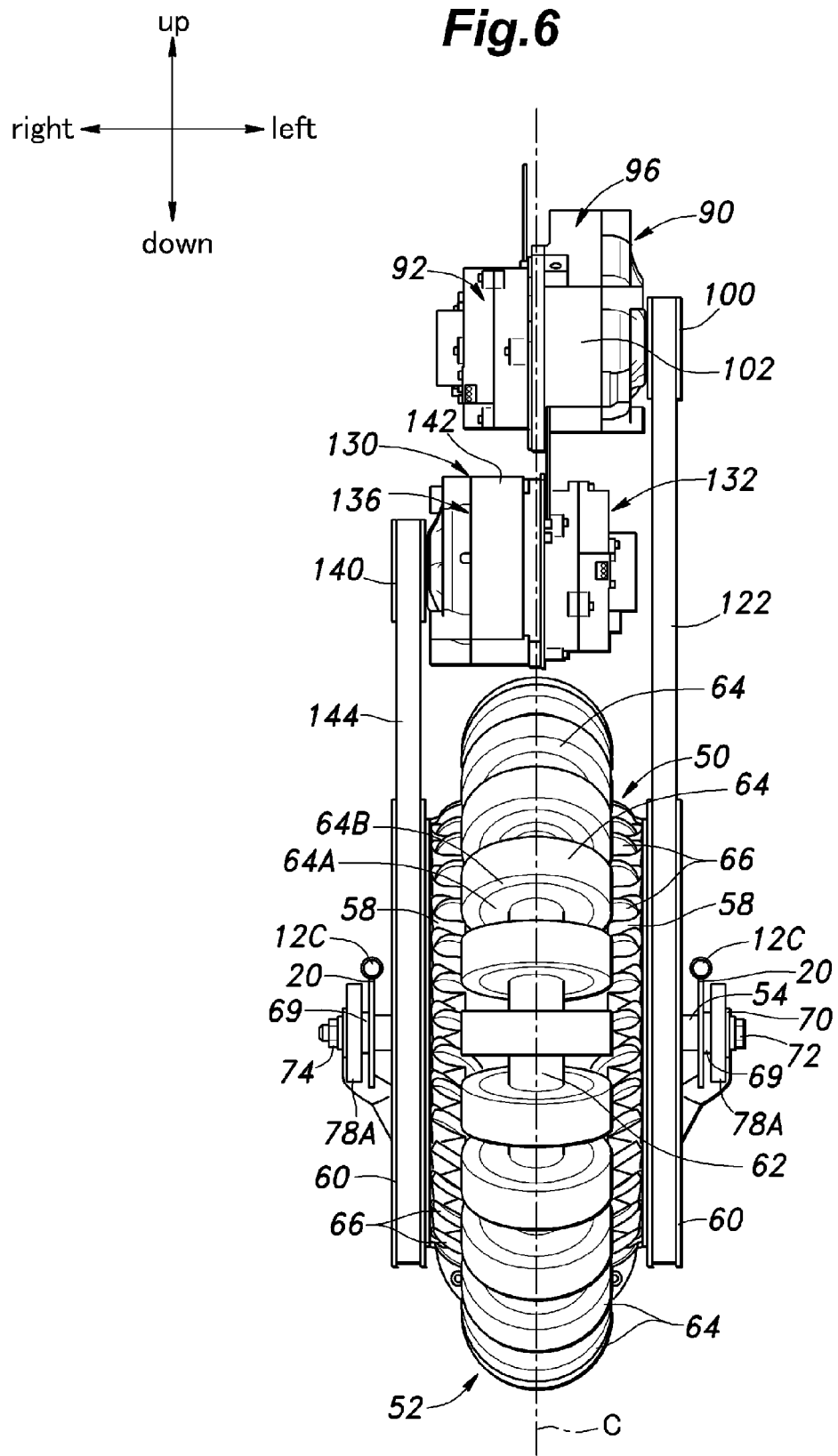
FIG. 6 is a front view of a pair of drive units and a propulsion unit of the inverted pendulum type vehicle.

When the two drive disks 58 are fitted on the hollow axle shaft 54, the main wheel 52 is supported coaxially between the drive disks 58 via the corresponding drive rollers 66 as shown in FIGS. 2 and 6 so that the main wheel 52 is firmly held in this position.

More specifically, the outer circumferential surface of each drive roller 66 of each drive disk 58 engages the outer circumferential surface of the corresponding driven roller 64 of the main wheel 52 defined by the rubber outer peripheral part 64B. The points of contact between the drive rollers 66 and the driven rollers 64 are symmetric to each other about a central plane perpendicular to the axial direction of the drive disks 58. The contact point on each driven roller 64 is located somewhat radially inward than the annular center line (cross sectional center line) of the annular member 62. In other words, the axial distance between the opposing drive rollers 66 of the two drive disks 58 is smaller than the outer diameter of the driven rollers 64.

By thus interposing the driven rollers 64 between the drive rollers 66 of the two drive disks 58 from the two lateral sides, the main wheel 52 is supported between the two drive disks 58 so as to be rotatable around a rotational center line common to the two drive disks 58 without requiring a central shaft.

The two drive disks 58, the two driven pulleys 60, the hollow axle shaft 54 and the main wheel 52 jointly form a subassembly serving as the prolusion unit 50.

In this subassembly, the axial distance between the two drive disks 58 is appropriately determined by the axial distance between the two positioning annular shoulders 54A provided on either axial end parts of the hollow axle shaft 54. Therefore, the friction between the drive rollers 66 of the drive disks 58 and the driven rollers 64 of the main wheel 52 can be accurately controlled, and this facilitates the manufacture and maintenance of the vehicle.

The propulsion unit 50 is disposed between the two lower side pipe members 12C of the propulsion unit support portion 12, and the two ends of the hollow axle shaft 54 of the propulsion unit 50 is supported by the bearing cutouts 20A of the axle support plates 20. More specifically, a small diameter portion 54C formed at each axial end of the hollow axle shaft 54 is received in the corresponding bearing cutout 20A with the annular shoulder of the hollow axle shaft 54 defined by the small diameter portion 54C axially engaging the axle support plates 20. A collar member 69 is fitted on each small diameter portion 54C of the hollow axle shaft 54. A long threaded bolt 72 is passed axially into the central bore of the hollow axle shaft 54 from one end of the hollow axle shaft 54, and a nut 74 is fastened onto the free end of the threaded bolt 72 such that the two collar members 69 fitted on the respective small diameter portions 54C of the hollow axle shaft 54 are firmly interposed between the head of the threaded bolt 72 and the nut 74 via a washer 70 in each case. As a result, each axle support plate 20 is firmly held between the corresponding annular shoulder of the hollow axle shaft 54 and the head of the threaded bolt 72 or the nut 74, as the case may be, via the corresponding washer 70.

The propulsion unit 50 formed as a subassembly can be mounted on the propulsion unit support portion 12 as described in the following. First of all, the propulsion unit 50 is placed between the two lower side pipe members 12C of the propulsion unit support portion 12, and the small diameter portions 54C formed on either axial end of the hollow axle shaft 54 is received in the corresponding bearing cutouts 20A (see FIG. 4) from below.

Then, the collar member 69 is fitted on the part of on one of the small diameter portions 54C which is located outside of the part thereof engaged by the axle support plate 20, and the threaded bolt 72 is passed into the central bore 55 of the hollow axle shaft 54 with the washer 70 placed between the head of the threaded bolt 72 and the opposing end surface of the collar member 69. This causes the free end of the threaded bolt 72 to projects from the opposite open end of the central bore 55 of the hollow axle shaft 54.

The other collar member 69 is fitted on the part of the other small diameter portion 54C which is also located outside of the part thereof engaged by the axle support plate 20, and the nut 74 is fastened onto the threaded portion formed on the free end of the thread bolt 72 projecting from the opposite open end of the central bore 55 of the hollow axle shaft 54 with the other washer 70 interposed between the nut 74 and the opposing end surface of the collar member 69. This completes the mounting of the propulsion unit 50 on the propulsion unit support portion 12.

Thus, the two drive disks 58, the two driven pulleys 60, the hollow axle shaft 54 and the main wheel 52 are combined as a single unit which can be easily mounted on the vehicle body frame 10 without complicating the overall structure.

The propulsion unit 50 may include a tail wheel unit 80 which is supported by the hollow axle shaft 54 via a tail wheel arm 78. The tail wheel arm 78 includes a linearly extending rear end and a pair of bifurcated free ends 78A. The tail wheel arm 78 is pivotally supported, via a pair of ball bearings (radial ball bearings) 76, by the collar members 69 fitted on the small diameter portions 54C on either axial end of the hollow axle 58 at the respective bifurcated free ends 78A thereof so that the two drive disks 58, the two driven pulleys 60 and the main wheel 52 are located between the bifurcated free ends 78A of the tail wheel arm 78. Thereby, the tail wheel arm 78 can extend rearward from the main wheel 52 without interfering with the two drive disks 58 or the two driven pulleys 60.

Each U-shaped reinforcing pipe member 30 is fixedly fitted with a rearward tilt limiting stopper 34 which limits an upward pivoting movement (counter clockwise pivoting movement in FIG. 1) of the tail wheel arm 78 with respect to the vehicle body frame 10 by engaging the tail wheel arm 78. In other words, the U-shaped reinforcing pipe members 30 limit the maximum rearward tilting of the vehicle body frame 10.

Each step support pipe member 36 is fixedly fitted with a forward tilt limiting stopper 42 which limits a downward pivoting movement (clockwise pivoting movement in FIG. 1) of the tail wheel arm 78 with respect to the vehicle body frame 10 by engaging the tail wheel arm 78. In other words, the step support pipe members 36 limit the maximum forward tilting of the vehicle body frame 10.

The tail wheel unit 80 is attached to the rear end of the tail wheel arm 78, and comprises a tail wheel 82 rotatably supported by the tail wheel arm 78, an electric motor 84 for rotatively actuating the tail wheel 82 in either rotational direction and an outer shell 85 covering the tail wheel 82 and the electric motor 84. The tail wheel arm 78 is rotatable around the axial line of the hollow axle shaft 54, and the tail wheel 82 engages the road surface under the weight of the tail wheel arm 78 and the tail wheel unit 80.

The tail wheel 82 comprises an annular or disk-shaped center member supported by the tail wheel arm 78 so as to be rotatable around a fore and aft axial line (which is perpendicular to the rotational center line of the main wheel 52 and a plurality of free rollers rotatably fitted along the outer periphery of the center member so as to form an omni-wheel which allows the tail wheel 82 to move forward without any substantial friction owing to the free rotation of the free rollers and provides a lateral traction when the center member is rotatively actuated by the electric motor 84.

<Drive Unit>

Figure 9:
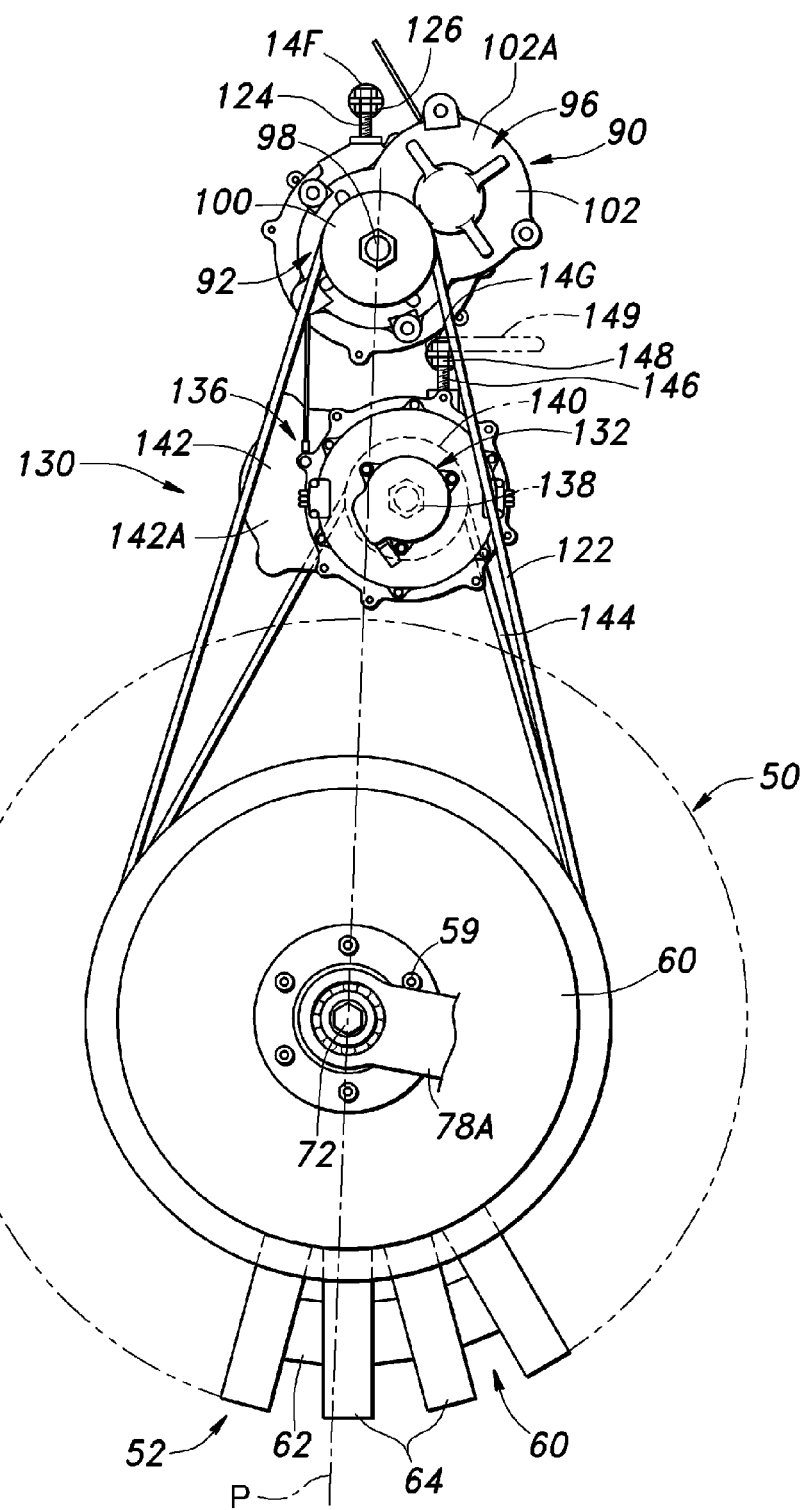
FIG. 9 is fragmentary side view of the drive units and the propulsion unit of the inverted pendulum type vehicle.

As shown in FIGS. 1 and 2, the left drive unit 90 is received in the upper cage 14I defined by the pipe members of the drive unit support portion 14. As shown in FIGS. 6, 7 and 9, the left drive unit 90 includes an electric motor 92, a reduction gear unit 96 disposed to the left (the output shaft end) of the electric motor 92 and connected to the output shaft 94 of the electric motor 92 and a drive pulley 100 for a cogged belt fitted on the output shaft 98 of the reduction gear unit 96.

Figure 10:
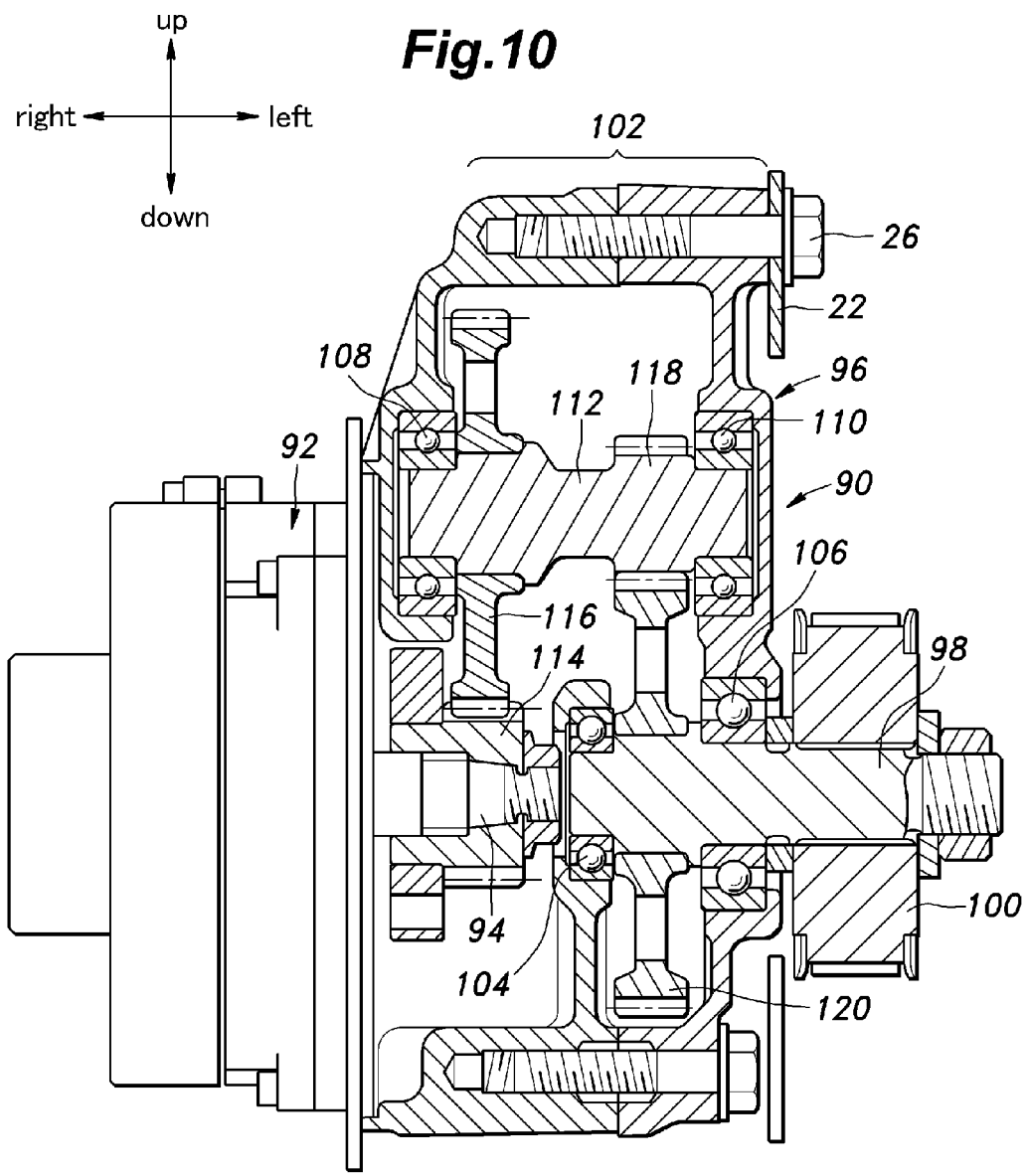
FIG. 10 is a sectional view of a speed reduction gear unit used in each of the drive units.

As shown in FIG. 10, the reduction gear unit 96 consists of a gear mechanism using two parallel shafts, and is encased in a gear box 102 partly filled with lubricating oil. The output shaft 94 of the electric motor 92 is fitted into the gear box 102. The reduction gear unit 96 includes an output shaft 98 rotatably supported by a pair of ball bearings 104 and 106 in an axial alignment with the motor output shaft 94, an intermediate shaft 112 rotatably supported by a pair of ball bearings 108 and 110 in parallel with the output shaft 98, a pinion 114 fixed on the free end of the motor output shaft 94, a large spur gear 116 fixed on the intermediate shaft 112 and in mesh with the pinion 114, a small gear 118 fixed on the intermediate shaft 112 and a large gear 120 fixed on the reduction gear unit output shaft 98 and in mesh with the small gear 118.

In this gear reduction unit 96, the intermediate shaft 112 is located radially outward with respect to the radial profile of the electric motor 92, and this creates a radially projecting part 102A of the gear box 102 which projects obliquely in an upward and rearward direction.

The free end of the reduction gear unit output shaft 98 projects out of the gear box 102 in the direction facing away from the electric motor 92, and is fixedly fitted with the drive pulley 100. In other words, the reduction gear unit 96 is placed between the electric motor 92 and the reduction gear unit output shaft 98.

The left wall of the gear box 102 is formed with a plurality (three, in the illustrated embodiment) of threaded holes (not shown in the drawings), and the left drive unit mounting plate 22 is formed with a corresponding number (three, in the illustrated embodiment) of through holes 22A as shown in FIG. 4. A threaded bolt 26 is passed into each of the through holes 22A and threaded into the corresponding threaded hole of the left wall of the gear box 102 to fixedly secure the reduction gear unit 96 of the left drive unit 90 to the left drive unit mounting plate 22. The left drive unit 90 can be installed in the upper cage 14I by introducing the left drive unit 90, from the end of the reduction gear unit 96, into the upper cage 14I via the open right side of the upper cage 14I.

The reduction gear unit output shaft 98 extends out of the upper cage 14I from a cutout 22B formed in the left drive unit mounting plate 22 (FIG. 4), and the drive pulley 100 is attached to this projecting end of the reduction gear unit output shaft 98 immediately adjacent to the outer surface of the left drive unit mounting plate 22. An endless cogged belt 122 is passed around the drive pulley 100 and the left driven pulley 60. The left drive unit mounting plate 22 not only supports the left drive unit 90 but also serves as a gusset plate for reinforcing the upper cage 14I. Therefore, the left drive unit 90 that drives the endless cogged belt 122 via the output shaft 98 is firmly supported by the vehicle body frame 10 via the left drive unit mounting plate 22.

The cutout 22B of the left drive unit mounting plate 22 is configured and dimensioned such that the drive pulley 100 as mounted on the output shaft 98 may be passed across the left drive unit mounting plate 22. Therefore, the left drive unit 90 can be installed in the upper cage 14I and attached to the left drive unit mounting plate 22 with a minimum effort.

Each through hole 22A of the left drive unit mounting plate 22 is vertically elongated so that the mounting position of the left drive unit 90 can be vertically adjusted to the extent permitted by the length of the through holes 22A. By vertically adjusting the position of the left drive unit 90, the tension applied to the cogged belt 122 can be adjusted. In other words, the through holes 22A serve as a guide for the vertical movement of the left drive unit 90 in cooperation with the threaded bolts 26.

As shown in FIGS. 4 and 9, the upper lateral pipe member 14F is provided with a vertical through hole which receives an adjust bolt 124 (having a head in an upper part thereof) from above, and the threaded lower end thereof is threaded into a threaded hole (not shown in the drawings) formed in the upper wall of the gear box 102.

By turning the adjust bolt 124 in either direction with the threaded bolts 26 slightly unfastened, the left drive unit 90 can be displaced vertically within the upper cage 14I, and this causes a corresponding change in the tension of the cogged belt 122. Once a desired tension is achieved, the threaded bolts 26 are fully fastened so that the desired tension may be maintained. The adjust bolt 124 is provided with a lock nut 126 so that the adjusted position of the adjust bolt 124 may be maintained during the operation of the vehicle.

Figure 3:
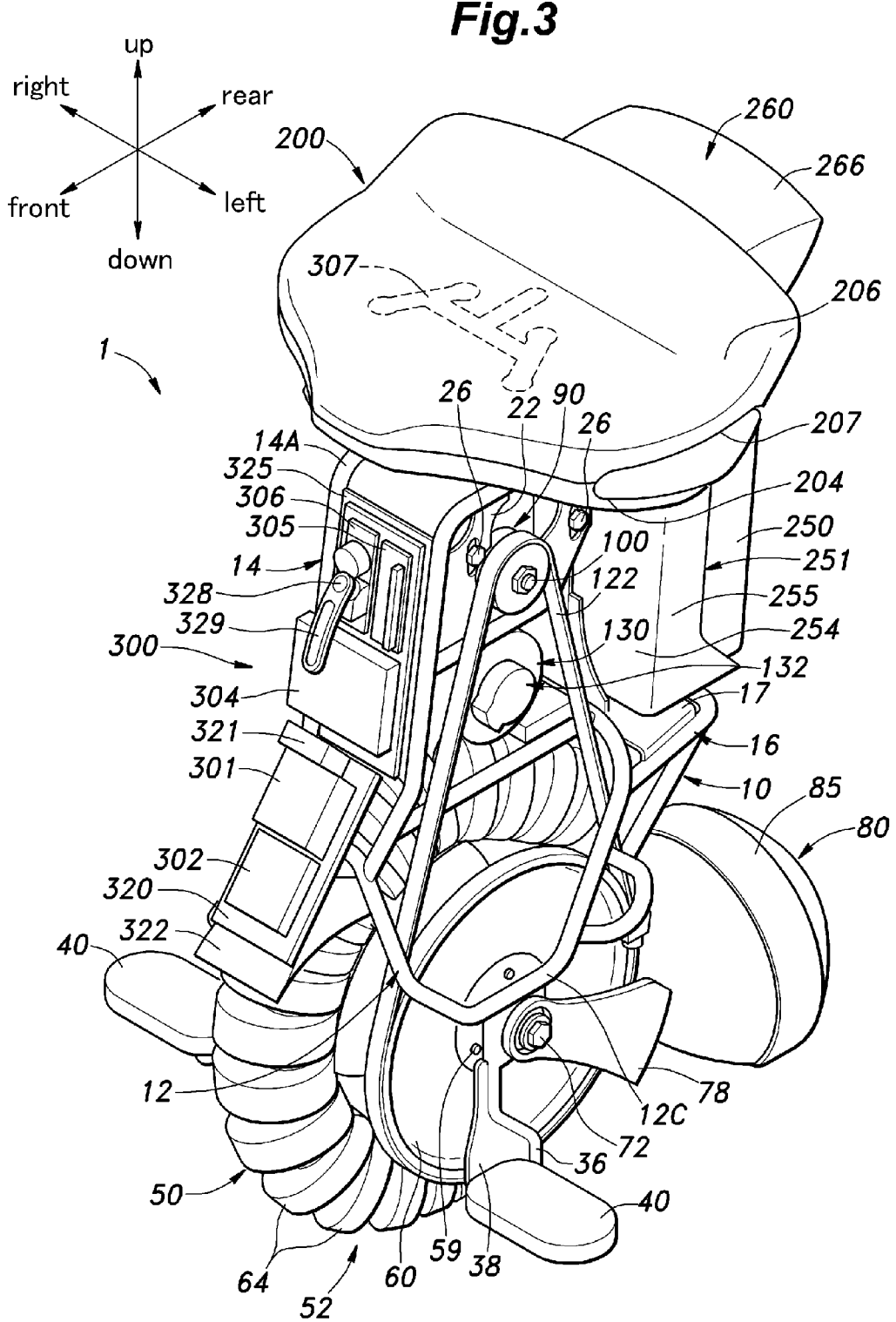
FIG. 3 is a front perspective view of the inverted pendulum type vehicle.

The right drive unit 130 is received in the lower cage 14J as shown in FIGS. 1 and 3. The right drive unit 130 is substantially a mirror image of the left drive unit 90, and, as shown in FIGS. 6, 7 and 9, comprises an electric motor 132, a reduction gear unit 136 disposed to the right or to the side of the output shaft (not shown in the drawings) of the electric motor 132 and connected to the output shaft of the electric motor 132 and a drive pulley 140 for a cogged belt fitted on the output shaft 138 of the reduction gear unit 136.

Similarly as the reduction gear unit 96 of the left drive unit 90, the reduction gear unit 136 of the right drive unit 130 consists of a gear mechanism using two parallel shafts, and is encased in a gear box 142 partly filled with lubricating oil. As the internal structure, as well as the speed reduction ratio, of the gear box 142 is similar to that of the reduction gear unit 96, the detailed description is omitted. In this gear reduction unit 136, the intermediate shaft (not shown in the drawing) is located radially outward with respect to the radial profile of the electric motor 132, and this creates a radially projecting part 142A of the gear box 142 which projects in a forward direction.

The free end of the reduction gear unit output shaft 138 projects out of the gear box 142 in the direction facing away from the electric motor 142 (or to the right), and is fixedly fitted with the drive pulley 140. In other words, the reduction gear unit 136 is placed between the electric motor 142 and the reduction gear unit output shaft 138.

The right wall of the gear box 142 is formed with a plurality (three, in the illustrated embodiment) of threaded holes (not shown in the drawings), and the right drive unit mounting plate 24 is formed with a corresponding number (three, in the illustrated embodiment) of through holes 24A as shown in FIG. 4. A threaded bolt 28 is passed into each of the through holes 24A and threaded into the corresponding threaded hole of the right wall of the gear box 142 to fixedly secure the reduction gear unit 136 of the left drive unit 140 to the right drive unit mounting plate 24. The right drive unit 140 can be installed in the lower cage 14J by introducing the right drive unit 140, from the end of the reduction gear unit 136, into the lower cage 14J via the open left side of the lower cage 14J.

The reduction gear unit output shaft 138 extends out of the lower cage 14J from a cutout 24B formed in the right drive unit mounting plate 24 (FIG. 4), and the drive pulley 140 is attached to this projecting end of the reduction gear unit output shaft 138 immediately adjacent to the outer surface of the right drive unit mounting plate 24. An endless cogged belt 144 is passed around the drive pulley 140 and the right driven pulley 60. The right drive unit mounting plate 24 not only supports the right drive unit 140 but also serves as a gusset plate for reinforcing the lower cage 14J. Therefore, the right drive unit 140 that drives the endless cogged belt 144 via the output shaft 138 is firmly supported by the vehicle body frame 10 via the right drive unit mounting plate 24.

Each through hole 24A of the right drive unit mounting plate 24 is vertically elongated so that the mounting position of the right drive unit 140 can be vertically adjusted to the extent permitted by the length of the through holes 24A. By vertically adjusting the position of the right drive unit 140, the tension applied to the cogged belt 144 can be adjusted. In other words, the through holes 24A serve as a guide for the vertical movement of the right drive unit 140 in cooperation with the threaded bolts 28.

As shown in FIGS. 4 and 9, the lower lateral pipe member 14G is provided with a vertical through hole which receives an adjust bolt 126 (having a head in an upper part thereof) from above, and the threaded lower end thereof is threaded into a threaded hole (not shown in the drawings) formed in the upper wall of the gear box 142.

By turning the adjust bolt 146 in either direction with the threaded bolts 28 slightly unfastened, the right drive unit 140 can be displaced vertically within the lower cage 14J, and this causes a corresponding change in the tension of the cogged belt 144. Once a desired tension is achieved, the threaded bolts 28 are fully fastened so that the desired tension may be maintained. The adjust bolt 126 is provided with a lock nut 148 so that the adjusted position of the adjust bolt 126 may be maintained during the operation of the vehicle.

Because the adjust bolts 124 and 146 are threaded into the corresponding parts of the left drive unit 90 and the right drive unit 140 from above or pull the corresponding parts of the left drive unit 90 and the right drive unit 140 from outside of the loop of the cogged belts 122 and 144, the access to the adjust bolts 124 and 146 can be facilitated.

Even when the left drive unit 90 is received in the upper cage 14I, a space 149 is defined between the bottom end of the left drive unit 90 and the head of the adjust bolt 146 for the right drive unit 140 so that a tool T for turning the adjust bolt 146 may be accessible to the head of the adjust bolt 146 from a side. In the illustrated embodiment, the lower part (the right branch pipe member 14D and the left branch pipe member 14E) of the upper cage 14I also serves as an upper part of the lower cage 14J, and the adjust bolt 146 is provided on the lower lateral pipe member 14G extending between the right branch pipe member 14D and the left branch pipe member 14E. In such a case, the head of the adjust bolt 146 can be accessed from the side (right side) which is opposite to the side where the left drive unit mounting plate 22 is attached. Thereby, the tension of the lower cogged belt 144 can be adjusted by turning the lower adjust bolt 146 without being interfered by the upper cogged belt 122. Similarly, the head of the upper adjust bolt 124 can be accessed from the side (right side) opposite from the left drive unit mounting plate 22 so that the tensions of the cogged belts 122 and 124 can be adjusted from the same side (right side).

The two driven pulleys 60 are provided with a same number of teeth, and the two drive pulleys 100 and 140 have a same number of teeth which is smaller than the number of teeth of the driven pulleys 60. Therefore, speed is reduced in the power transmission from each drive pulley 100, 140 to the corresponding driven pulley 60. The two cogged belts 140 differ in length from each other, but the drive pulley 100 and the driven pulley 60 of one side are identical to the drive pulley 140 and the driven pulley 60 of the other side.

The left drive unit 90 and the right drive unit 130 are symmetric to each other, and are vertically offset from each other. The two units 90 and 130 in large part overlap each other in plan view. The electric motor 92 of the left drive unit 90 received in the upper cage 14I is located laterally to the right or opposite from the reduction gear unit 96 with respect to the vehicle center line C (see FIG. 6), and the electric motor 132 of the right drive unit 130 received in the lower cage 14J is located laterally to the left or opposite from the reduction gear unit 136 with respect to the vehicle center line C (see FIG. 6).

Owing to this arrangement, the electric motor 92 of the left drive unit 90 is located directly above the reduction gear unit 136 of the right drive unit 130, and the gear reduction unit 97 of the left drive unit 90 is located directly above the electric motor 132 of the right drive unit 130.

In the inverted pendulum type vehicle of the illustrated embodiment, because the left drive unit 90 and the right drive unit 130 are located above the main wheel 52 one above the other, and substantially overlap each other in plan view, the lateral width of the vehicle can be minimized as compared to the case where the left drive unit 90 and the right drive unit 130 are located laterally next to each other.

Therefore, the size of the electric motors 92 and 132 and hence the output power thereof can be maximized, and the reduction gear units 96 and 136 can be added without substantially increasing the lateral width of the vehicle body. The use of the reduction gear units 96 and 136 contributes to the increase in the drive torque of the drive disks 58 and hence the increase in the drive torque of the main wheel 52. Furthermore, because each reduction gear unit 96, 136 includes a pair of parallel shafts, and the output shafts of the electric motor 92, 132 and the reduction gear unit 96, 136 are aligned coaxial to each other, the drive units 90 and 139 can be constructed as highly compact units even when the electric motor 92, 132 is internally provided therein. Therefore, the vehicle may be designed to have a larger or smaller output torque simply by selecting drive units 90 and 139 of a desired output torque without requiring any major change to the basic design of the vehicle.

By placing the two drive units 90 and 139 one above the other, the gravitational center of the inverted pendulum type vehicle 1 can be placed in a relatively upper part of the vehicle, and this simplifies the inverted pendulum control of the vehicle.

The two drive units 90 and 139 are placed one above the other in laterally mutually inverted orientations so that a favorable lateral weight balance can be achieved. Furthermore, the two electric motors 92 and 132 which generate significant amounts of heat are not only vertically but laterally spaced apart from each other so that potential thermal problems can be avoided. Because the two electric motors 92 and 132 are placed on the relatively open sides of the vehicle body frame 10 or on the opposite sides of the left and right drive unit mounting plates 24, respectively, a favorable cooling of the electric motors 92 and 132 can be achieved, and the wiring or placing of wire harness for the two electric motors 92 and 132 is facilitated.

Because the radially projecting part 102A of the reduction gear unit 96 of the left drive unit 90 projects obliquely rearward and upward while the radially projecting part 142A of the reduction gear unit 136 of the right drive unit 130 projects obliquely forward, or the two radially projecting parts 102A and 142A of the reduction gear units 96 and 136 located in upper and lower parts of the vehicle body frame 10, respectively, project in mutually different radial directions, the available space in the vehicle body frame 10 can be efficiently utilized, and a favorable weight balance can be achieved in the fore and aft direction. The projecting directions of the two radially projections parts 102A and 142A are not limited by the illustrated embodiment as long as the directions are selected so that an efficient utilization of available space is utilized. For instance, the upper radially projecting part 102A may be directed rearward or forward, and may also be directed obliquely either in the upward or downward direction. The lower radially projecting part 142 is preferably directed in a different direction from that of the upper radially projecting part 102A in the fore and aft direction, and may also be directed obliquely in either upward or downward direction.

The fact that the radially projecting part 102A of the reduction gear unit 96 of the left drive unit 90 projects obliquely rearward and upward contributes to placing the gravitational center of the inverted pendulum type vehicle 1 in a relatively upper part thereof, and this contributes to the simplification of the inverted pendulum control of the vehicle. The fact that the radially projecting part 142A of the reduction gear unit 136 of the right drive unit 130 is located forward to the rotational center line of the electric motor 132, combined with the fact that the rotational center line of the reduction gear unit output shaft 138 of the right drive unit 130 is more rearwardly offset than the rotational center line of the reduction gear unit output shaft 98 of the left drive unit 90, contributes to an efficient utilization of the available space or the saving of the necessary space.

The left drive unit 90 and the right drive unit 130 each consist of an assembly of the corresponding electric motor 92, 132 and reduction gear unit 96, 136, and the reduction gear units 96 and 136 include the gear boxes 102 and 142 that are partly filled with lubricating oil while the associated cogged belt systems (the drive pulleys 100 and 140, the cogged belts 122 and 144 and the driven pulley 60) are required to be dry or free from contamination of oil or other substances that may prevent the proper operation thereof. In the illustrated embodiment, the gear boxes 102 and 142 can be placed remote from the cogged belt systems so that the servicing of the left drive unit 90 and the right drive unit 130 and the associated cogged belt systems can be simplified.

The assembling of the various units can be accomplished as discussed in the following. First of all, the subassembly or the propulsion unit 50 including the drive disks 58 rotatably fitted on the hollow axle shaft 54 and fixedly connected to the corresponding driven pulleys 60 and the main wheel 52 interposed between the drive disks 58 is mounted on the axle support plates 20 by using the threaded bolts 72 and the nuts 74, and the left drive unit 90 and the right drive unit 130 fitted with the corresponding drive pulleys 100 and 140 are mounted on the drive unit mounting portion 14. Then, each cogged belt 122,144 is passed around the corresponding drive pulley 100, 140 and driven pulley 60. This completes the assembling of the propulsion and drive systems of the inverted pendulum type vehicle 1.

As shown in FIG. 9, the rotational center line of the reduction gear unit output shaft 98 of the left drive unit 90 is located on the plumb vertical line P passing through the rotational center of the hollow axle 65, but the rotational center line of the reduction gear unit output shaft 138 of the right drive unit 130 is more rearwardly offset than the rotational center line of the reduction gear unit output shaft 98 of the left drive unit 90 as seen from a side.

<Seat Unit>

Figure 5:
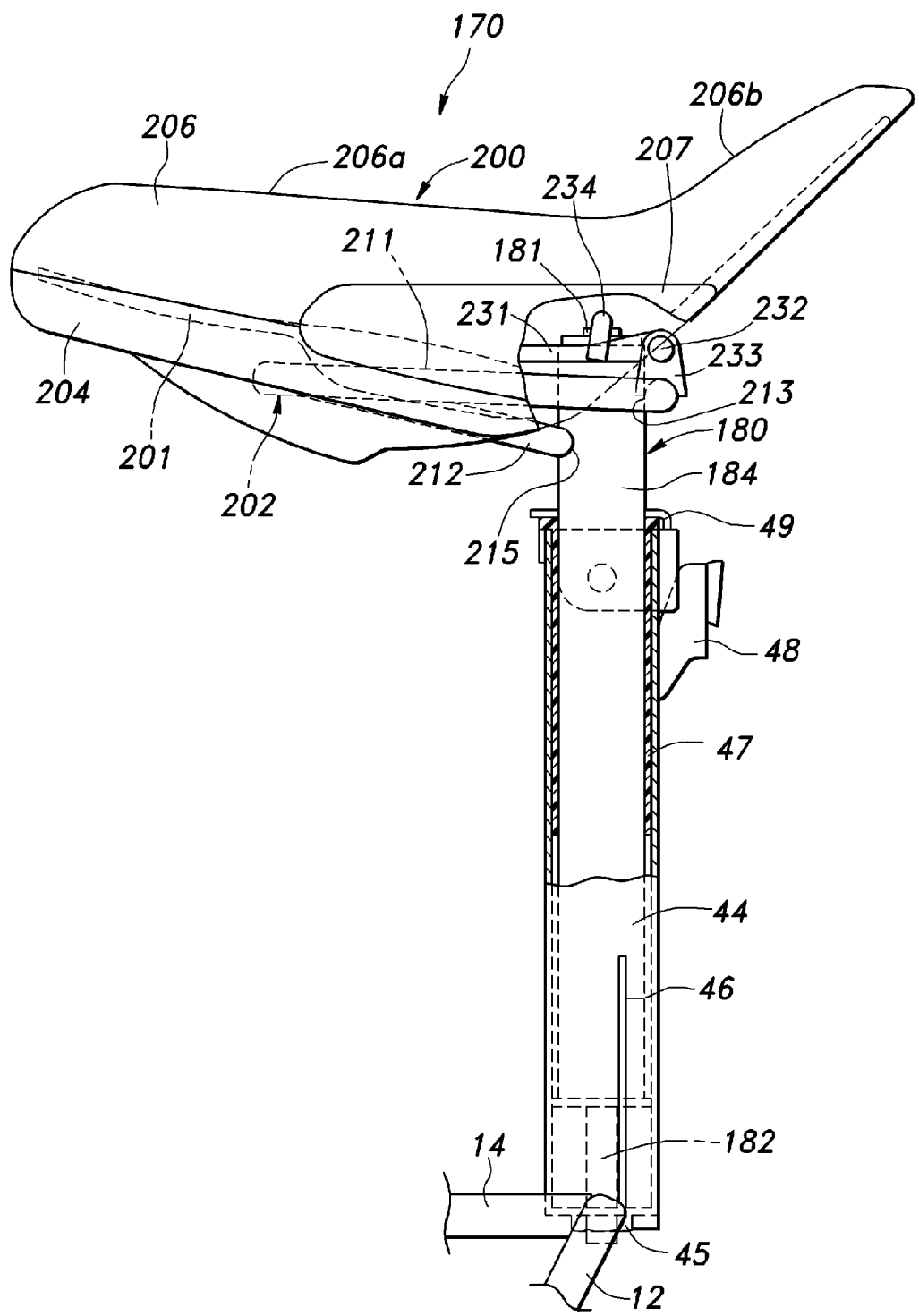
FIG. 5 is a side view partly in section of a seat support portion of the inverted pendulum type vehicle.

As shown in FIG. 5, a cylindrical bush 47 made of plastic material is fitted into the upper part of the center post 44. The upper end of the bush 47 is formed with a radial flange 47A which abuts the upper end of the center post 44, and the bush 47 is held retained in the center post 44 by abutting the upper (outer) end of the flange 47A with a retaining member 49 fixed to the center post 44.

The center post 44 receives a telescopic pillar 180 from the upper end thereof via the bush 47, and a seat 200 is attached to the upper end of the telescopic pillar 180 so that the height of the seat 200 may be adjusted as will be discussed hereinafter. The telescopic pillar 180 is located between the drive units 90 and 130 and the battery pack 250 in the fore and aft direction of the vehicle so that the space available in the vehicle body frame 10 is efficiently utilized. In this arrangement, the drive units 90 and 130 and the battery pack 250 accounting for a large part of the weight of the vehicle are placed ahead and behind the telescopic pillar 180 (or the seat 200) so that a favorable weight balance of the vehicle can be accomplished. The telescopic pillar 180 consists of a locking gas spring including a piston rod 182 and a cylinder tube 184, and is introduced into the center post 44 with the piston rod end first. The free end of the piston rod 182 is fixed to the bottom end of the center post 44 by using a nut 45, and the cylinder tube 184 is slidably received in the bush 47 so as to be vertically moveable relative to the vehicle body frame 10.

The upper end of the cylinder tube 184 projects upward from the center post 44, and is fixedly secured to a seat frame 202 of the seat (saddle) 200. The seat frame 202 is formed by bending a pipe member into a rectangular shape. In addition to the seat frame 202, the seat 200 includes a base member 201 consisting of a plate member fixedly attached to the seat frame 202, a seat main body 206 attached to the upper part of the base member 201 and provided with a cushioning property, a seat bottom cover 204 attached to the lower part of the base member 201, and a pair of side guard members 207 attached to either side of the seat bottom cover 204. A seat elevation lever (operation lever) 198 (see FIG. 2) is provided on one side of the seat bottom cover 204 to selectively unlock the locking mechanism of the telescopic pillar 180 as will be discussed hereinafter.

The side guide members 207 are made of relatively hard material such as rubber and other elastomeric material, and located in laterally outermost parts of the seat 200. The side guide members 207 are configured to be gripped by the rider so as to enable the rider to maintain a stable riding posture even when the seat main body 206 is made of relatively soft material to provide a favorable ride quality. As shown in FIG. 2, the various parts of the vehicle are positioned so as to be inside an area bounded by a pair of imaginary lines L1 defined by connecting the outer end of the side guard member 207 of each side and the outer edge of the corresponding step 40 as seen in front view. In other words, the seat 200 and the steps 40 are given with relatively wide lateral expanses as compared with the outer shell 18 so that the outer shell 18 and various other parts of the vehicle body are protected from damages by the side guide members 207 and the steps 40 when the vehicle body has fallen sideways.

In the illustrated embodiment, the seat 200 is placed on the uppermost part of the telescopic pillar 180. The drive units 90 and 130 and a part of the battery unit are located under the seat 200 as shown in FIG. 1. Thereby, the vehicle body can be made compact, and a favorable weight balance of the vehicle body can be achieved at the same time. When the seat elevation lever 198 is operated, the locking of the telescopic pillar 180 is released so that the cylinder tube 184 is urged upward under the gas pressure within the telescopic pillar 180. Thus, simply by operating the seat elevation lever 198, the height of the seat main body 206 can be varied at will depending on the build or preference of the rider.

<Seat Elevation Mechanism>

Figure 11:
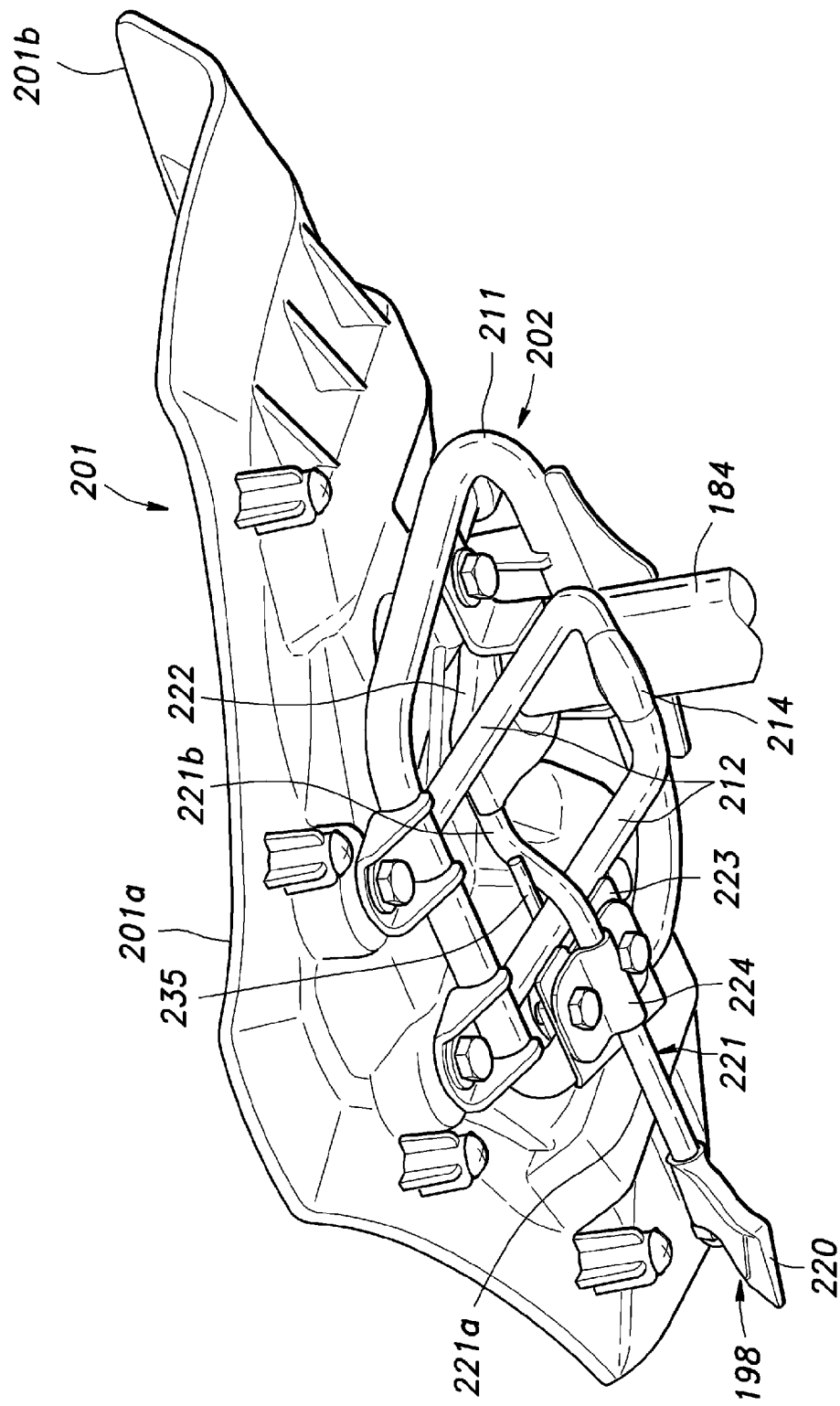
FIG. 11 is a bottom perspective view of a seat elevation mechanism.
Figure 12:
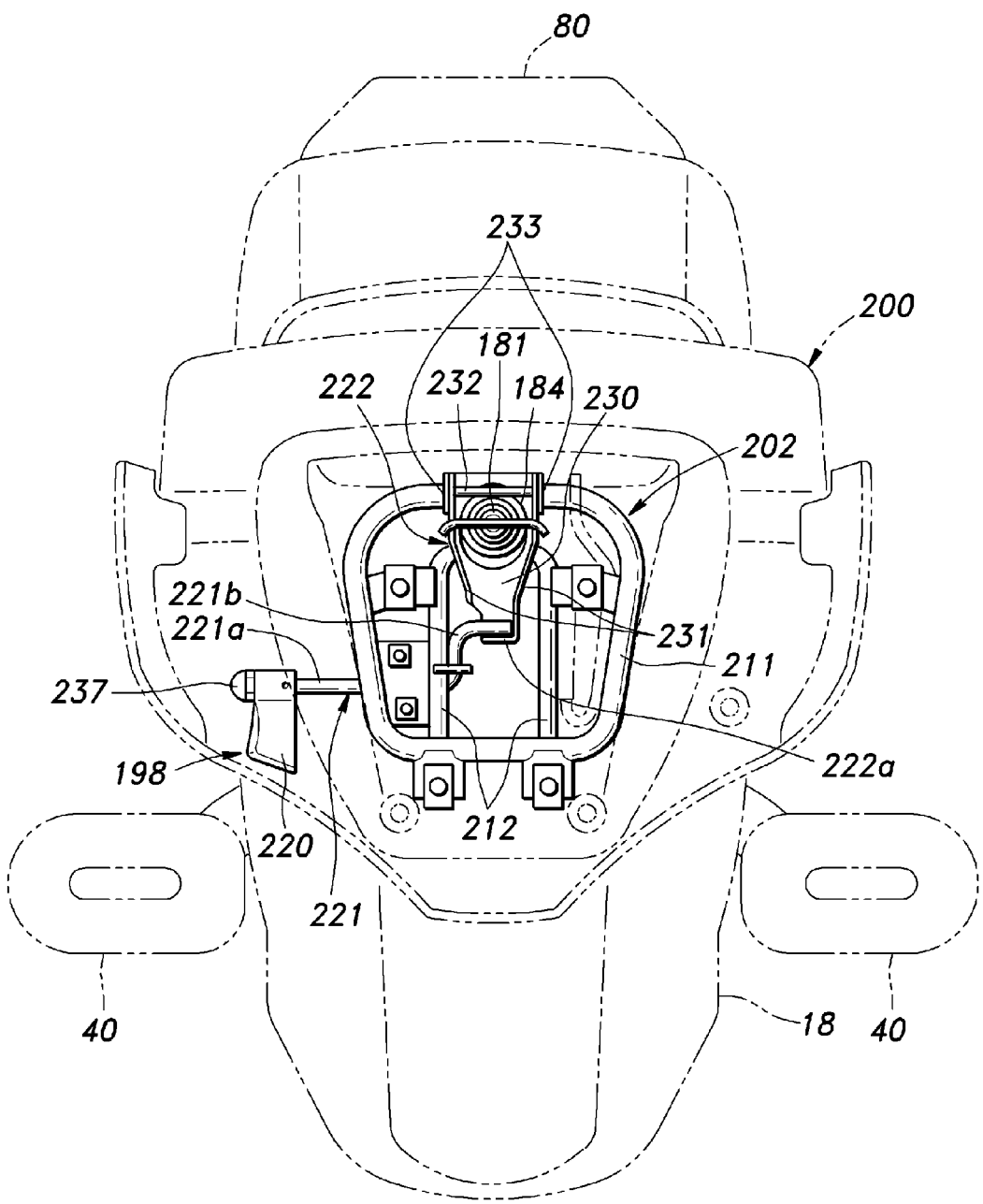
FIG. 12 is a plan view of the seat elevation mechanism.

The details of the seat elevation mechanism for the seat 200 using the telescopic pillar 180 are described in the following with reference to FIGS. 11 to 15. As shown in FIGS. 11 and 12, the seat frame 202 includes an annular main frame 211 extending substantially horizontally and secured to the lower surface of the base member 201 by using threaded bolts and a pair of sub frames 212 extending in the fore and aft direction across the main frame 211 in parallel to each other. The rear end of the main frame 211 is connected to a first connecting base 213 (see FIG. 5) fixed to the upper rear side of the cylinder tube 184 of the telescopic pillar 180.

The rear ends of the two sub frames 212 are connected to each other so as to form a U-shaped connecting portion 214 which is connected to a second connecting base 215 (see FIG. 5) attached from the upper front side of the cylinder tube of the telescopic pillar 180. The second connecting base 215 is lower in position than the first connecting base 213 to which the main frame 211 is connected. The forward ends of the sub frames 212 are connected to the inner side of the front lateral part of the main frame 211.

The telescopic pillar 180 is provided with a lock release button 181 for releasing the locking of the telescopic pillar 180 at the upper end. An actuating arm 222 is pivotally supported by the seat frame 202 at a base end thereof, and extends above the lock release button 181. The seat elevation lever 198 includes a crank arm member 221 which is pivotally supported by the seat frame 202 at a base end portion 221a thereof consisting of a rod member extending in the lateral direction with the aid of a mounting member 224 which is mounted across the main frame 211 and one of the sub frames 212 under the seat frame 202 as shown in FIG. 11. The mounting member 224 is formed with a semi-cylindrical bearing surface surrounding the base end portion 221a. The crank arm member 221 further includes a free end portion 221b bent from the base end portion 221a into a crank arm. The terminal end of the free end portion 221b engages the lock release button 181 of the telescopic pillar 180 via the actuating arm 222.

The terminal end of the base end portion 221a is fitted with an operating piece 220. The operating piece 220 includes a through hole passed in the base end thereof which is fitted on a threaded terminal end of the base end portion 221a to the extent permitted by an annular shoulder formed in the base end portion 221a, and is fixedly secured to the base end portion 221a by fastening a cap nut 237 onto the threaded terminal end of the base end portion 221a.

Figure 13:
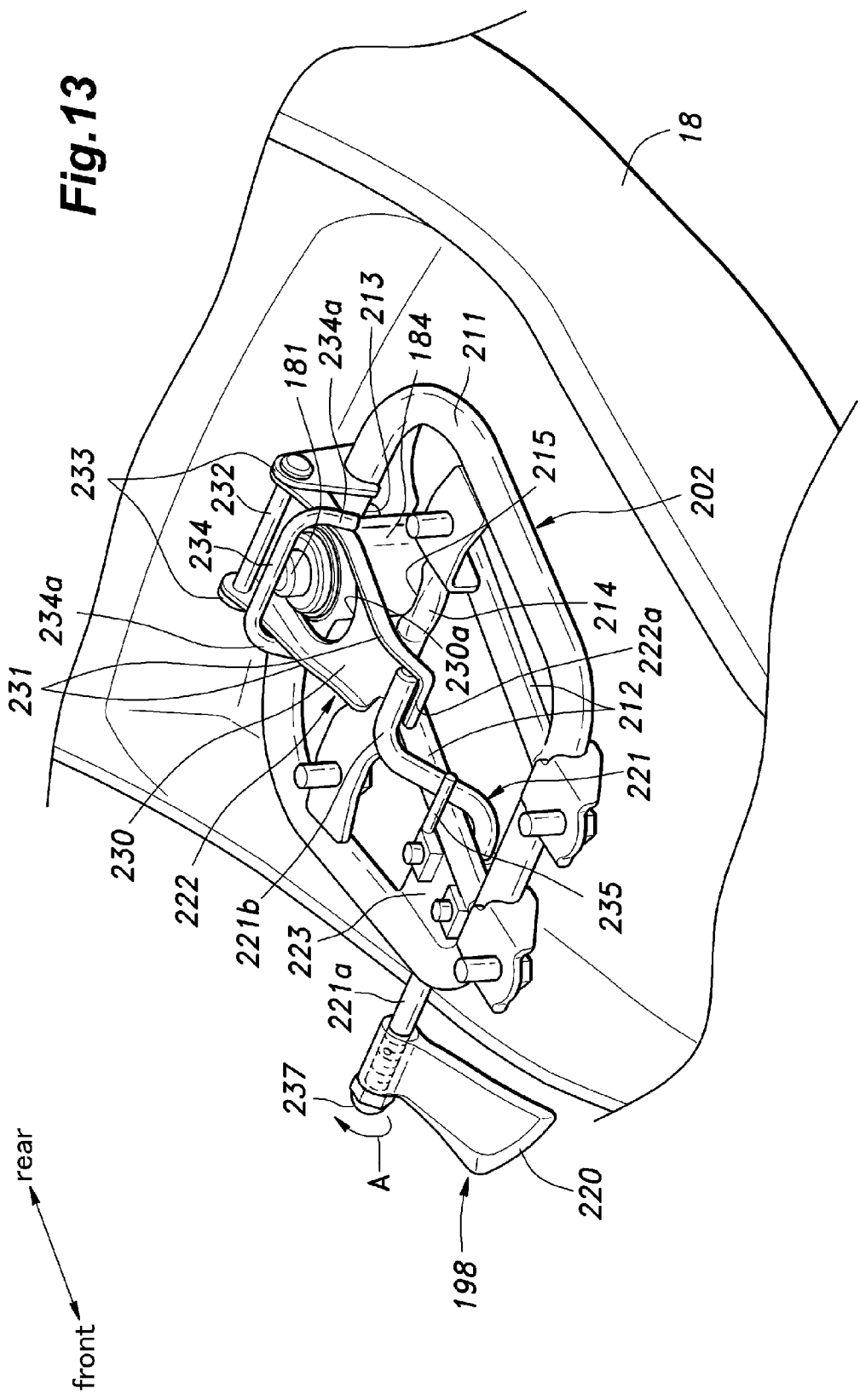
FIG. 13 is a perspective view of the seat elevation mechanism in a lowered position.

More specifically, as best shown in FIG. 13, the actuating arm 222 comprises a main body 230 consisting of a plate member and formed with an opening 230a for receiving an upper end of the cylinder tube 184 and a peripheral wall 231 extending upward along either side and the front side of the main body 230. A right front portion of the peripheral wall 231 is cut out to allow the terminal end of the free end portion 221b of the crank arm member 221 to come into direct engagement with the upper surface of the main body 230 of the actuating arm 222. The terminal end of the free end portion 221b of the crank arm member 221 is engaged by the peripheral wall 231 on the front side of the actuating arm 222, and is thereby prevented from being dislodged from the upper surface of the actuating arm 222.

A pivot shaft 232 is passed across the rear ends of the peripheral wall 231, and is pivotally supported by a pair of support pieces 233 extending upright from a rear end part of the main frame 211 on either side of the actuating arm 222. The pivot shaft 232 is located behind the telescopic pillar 180, and the point of engagement 222a between the crank arm portion 221b of the crank arm member 221 and the actuating arm 222 is located ahead of the telescopic pillar 180 (see FIG. 5). This arrangement allows the lever ratio or the ratio of the distance between the pivot shaft 232 to the point of engagement 222a to the distance between the pivot shaft 232 and the lock release button 181 to be maximized by using the limited available space under the seat main body 206. As a result, the rider can depress the lock release button 181 with a minimum force. The movement of the actuating arm 222 is accommodated by the space defined between the two sub frames 212. Furthermore, the seat frame 202 provides a stable base for supporting the seat elevation lever 198, and protects the seat elevation lever 198 from inadvertent operation from external interferences.

The actuating arm 222 is further provided with an actuation bar 234 extending across the opening 230a of the main body 230. The two ends of the actuation bar 234 are provided with leg portions 234a that extend vertically and are fixedly secured to the outer sides of the peripheral wall 222a such that the actuation bar 234 extends at a certain height from the upper surface of the main body 230 of the actuating arm 222. The actuation bar 234 is always in contact with the lock release button 181 which is resiliently urged upward by an internal spring not shown in the drawings.

Figure 14:
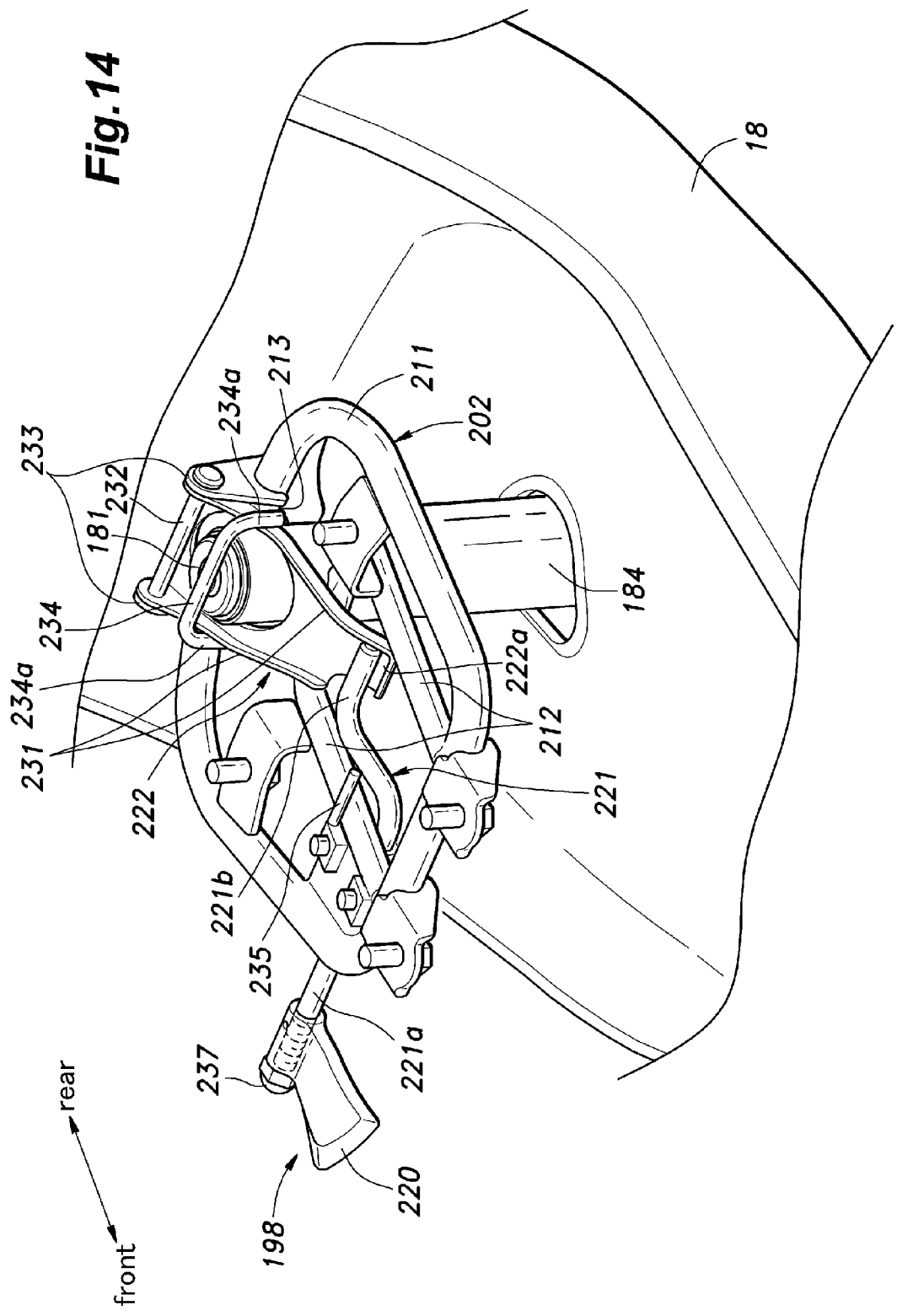
FIG. 14 is a perspective view of the seat elevation mechanism in a raised position.

The height of the seat 200 can be adjusted by lifting the forward end of the operating piece 220 (in the direction indicated by arrow A in FIG. 13) and turning the crank arm member 221 around the center line of the base end portion 221a. This causes the free end portion 221b of the crank arm member 221 to swing downward, and push down the front end of the actuating arm 222. As a result, as shown in FIG. 14, the actuation bar 234 pushes down the lock release button 181 to allow the cylinder tube 182 of the telescopic rod 180 to be lifted under the internal pneumatic spring force. Once the seat 200 has reached the desired height, the operating piece 220 is released, and this causes the telescopic rod 180 to be locked as the given length. When the seat 200 is desired to be lowered, by lifting the forward end of the operating piece 220, the rider is enabled to push down the seat 200 to the desired height. This desired position can be maintained simply by releasing the operating piece 220 at this point. The reverse movement of the operating piece 220 is restricted by a stopper pin 235 fixedly attached to one of the sub frames 212 to engage a part of the free end portion 221b of the crank arm member 221.

Figure 15:
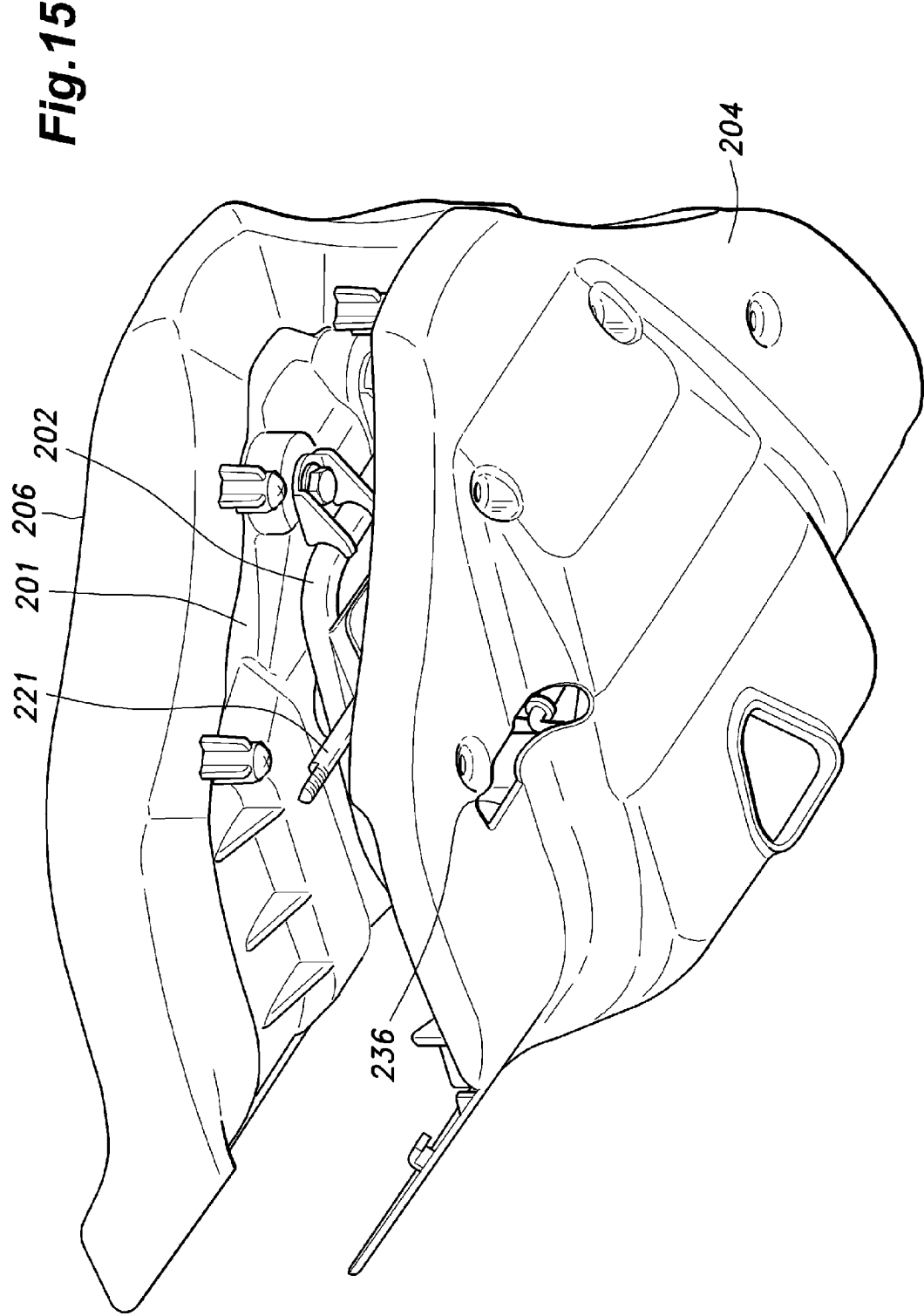
FIG. 15 is an exploded perspective view of a seat.

The seat elevation lever 198, except for the operating piece 220 and the terminal end portion of the outer terminal end of the crank arm member 221, is received within the seat 200. When assembling the seat elevation lever 198 to the seat 200, as shown in FIG. 15, the seat elevation lever 198 minus the operating piece 220 is mounted to the interior of the seat frame 202, and the seat 200 is assembled to the seat frame 202 while the right terminal end of the crank arm member 221 is passed through an opening (slit) 236 formed in the seat bottom cover 204. After the seat 200 has been fully assembled, the operating piece 220 is fitted on the right terminal end of the crank arm member 221, and is fixedly secured there to by fastening the cap nut 237. Thus, the seat elevation lever 198 can be assembled in a relatively simple manner.

The seat elevation lever 198, including the operating piece 220 and the associated part of the crank arm member 221 protruding from the opening 236, is located under the seat 200 as seen in plan view. At least the operating piece 220 located on the outermost part of the seat elevation lever 198 is located outside of the outer shell 18 under the seat 200 as seen in plan view. Therefore, when the vehicle is configured as a compact model such that the rider grips the vehicle body (outer shell) between the lower limbs of the rider, the seat elevation lever 198 can be easily reached by the rider but is protected from inadvertent operation by the rider or any external object.

<Battery Pack Support Structure>

As shown in FIGS. 1 and 3, a battery case 251 for retaining a battery pack 250 is placed on the shelf plate 17. The battery case 251 includes a rectangular bottom wall, a front wall 254 and a pair of side walls 255. The side walls 255 have a greater height than the front wall 254. The battery case 251 thus defines an upper opening 257 which extends from the upper front end to the lower rear end thereof. Alternatively, the opening 257 may also extend only between the upper front end to the upper rear end of the battery case 251. In the illustrated embodiment, the vertically middle part of the rear edge of each side wall 255 is recessed so that the middle part of the rear end of the battery pack 250 received in the battery case 251 may be more exposed than the upper and lower parts of the rear end of the battery pack 250.

A rearwardly extending bracket 258 is attached to the center post 44, and the front surface of the front wall 254 of the battery case 251 is fixedly attached to the bracket 258. The battery case 251 is generally enclosed by the outer shell 18 except for that the opening 257 is exposed to the outside by a rear opening of the outer shell 18.

The battery pack 250 is given with the shape of a vertically elongated rectangular box. The upper face of the bottom wall 253 of the battery case 251 is centrally provided with an engagement projection 262, and a corresponding engagement recess 263 is formed in the bottom face of the battery pack 250 as shown in FIG. 1 such that the lower part of the battery pack 250 is prevented from moving along the bottom wall 253 of the battery case 251, but is allowed to tilt rearward while resting upon the bottom wall 253 of the battery case 251 as will be described hereinafter. When the battery pack 250 is properly received in the battery case 251, an electric connection is established between the battery pack 250 and the internal electric unit of the vehicle via a contact arrangement made between the two parts (not shown in the drawings). Alternatively or additionally, an engagement projection may be formed on the rear surface of the front wall 254 for engagement with a corresponding recess formed in the front side of the battery pack 250 for the purpose of supporting the battery pack 250 in a stable manner.

Figure 16:
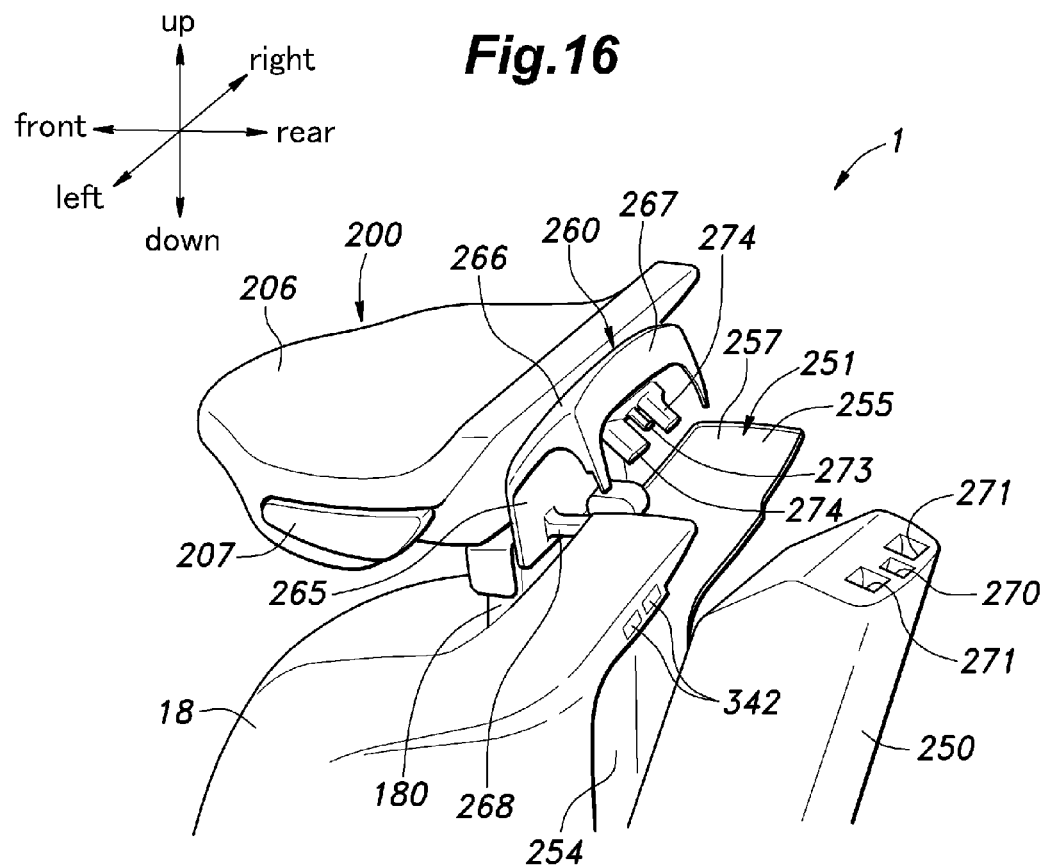
FIG. 16 is a fragmentary perspective view of the inverted pendulum type vehicle with a lid of a battery case in an open position.

As shown in FIGS. 1 and 16, a lid 260 which serves as an upper wall of the battery case 251 when closed is pivotally attached to the upper end of the front wall 254 of the battery case 251. The base end of the lid 260 is pivotally connected to an upper end of the front wall 254 which is somewhat lower than the two side walls 255, and the lid 260 includes a front vertical wall 265 which closes the part of the opening defined by the upper edge of the front wall 254 and extends to the upper edges of the two side walls 255, a middle horizontal wall 266 covering the part of the opening defined by the upper edges of the two side walls 255 and a rear vertical wall 267 which extends downward from the rear ends of the top edges of the side walls 255 (as seen in the closed state of the lid 260). Therefore, the lid 260 is provided with a rectangular C-shaped side view.

The lid 260 is provided with a pair of arms 268 projecting from the rear (or inner) surface of the front vertical wall 254 in a laterally mutually spaced apart relationship, and a laterally extending pivot shaft 269 extends across the two side walls 255 adjacent to the upper edge of the front vertical wall 254. The free ends of the arms 268 are rotatably engaged by the pivot shaft 269 so that the lid 260 is enabled to move angularly between the substantially horizontal closed position for closing the upper opening of the battery case 251 and a vertically raised open position adjacent to the seat 200. A torsion coil spring not shown in the drawing is wound around the pivot shaft 269 and engages the lid 260 and the front vertical wall 254 to resiliently urge the lid 260 to the open position. The seat 200 in the normal position interferes with the lid 260 in the open position so that the lid 260 can be brought to the open position only when the telescopic pillar 180 is adequately extended so as to place the seat 200 to a raised position which is substantially higher than the normal position for the rider to sit thereon. In other words, as long as the rider is seated on the seat 200 or the seat 200 is at a normal height suitable for the rider to seat thereon, the rear end of the seat 200 prevents the opening movement of the lid 260 in the opening direction beyond a certain limit so as to prevent the removal of the battery pack 250 from the battery case 251 as will be described hereinafter. When fully closed, the outer contour of the lid 260 smoothly continues to the surrounding contour of the outer shell 18 so as to present a smooth and attractive appearance of the exterior of the inverted pendulum type vehicle 1.

The upper face of the battery pack 250 is formed with a latch recess 270 and a pair of engagement recesses 271 located on either side of the latch recess 270. The lower face of the middle horizontal wall 266 of the lid 260 is formed with a latch 273 and a pair of engagement projections 274 located so as to correspond to the latch recess 270 and the engagement recesses 271 of the battery pack 250, respectively. The latch 273 in this embodiment consists of a push-push latch which alternates between the latched position and the unlatched position each time the latch 273 is pushed into the latch recess 270. Therefore, when the battery pack 250 is properly placed in the battery case 251, and the lid 260 is closed, the latch 273 is engaged by the engagement recess 270, and the lid 260 is held in the closed position. When the lid 260 is pushed from above once again, the latch 273 is disengaged from the latch recess 270, and the lid opens up under the spring force of the torsion coil spring provided in the hinge of the lid 260 as discussed earlier. The engagement projections 274 support the battery pack 250 against the lateral forces that may be applied to the battery pack 250 during the operation of the vehicle 1 by being engaged by the corresponding engagement recesses 271.

When installing the battery pack 250 in the battery case 251, the seat 200 is required to be fully raised by extending the telescopic pillar 180. This allows the lid 260 to be put into the open position. The battery pack 250 is then introduced into the battery case 251 from the rear end thereof with the lower end of the battery pack 250 placed more forward than the rest of the battery pack 250 and caused to rest upon the bottom wall 253. The proper positioning of the lower end of the battery pack 250 on the bottom wall 253 of the battery case 251 is facilitated by the engagement between the engagement projection 262 on the bottom wall 253 and the engagement recess 263 in the bottom face of the battery pack 250. The battery pack 250 is then tilted forward until the battery pack 250 is fully received in the battery case 251. The lid 260 is closed, and held in the latched position. Thereafter, the telescopic pillar 180 is retracted to place the seat 200 down to the normal operating position, and this prevents inadvertent opening of the lid 260. Therefore, the battery pack 250 can be securely held in the battery case 251 both against the external forces caused by the movement of the vehicle and the inadvertent opening of the lid 260 by external objects. The removal of the battery pack 250 can be accomplished by reversing the above discussed procedure. In particular, the lid 260 can be opened only after the telescopic pillar 180 is extended so as to place the seat 200 at an appropriate elevated position.

<Electric Unit>

As shown in FIG. 1, the electric unit 300 includes a main power drive unit 301 for controlling the main wheel 52 via the left and right drive units 90 and 130, a tail wheel power unit 302 for controlling the operation of the tail wheel unit 80, a DC-DC converter 304 for converting the voltage of the DC power supplied from the battery pack 250 into the voltages suitable for various parts of the electric unit 300, an I/O interface unit 305 for exchanging signals between the various sensors and the control circuits of the electric unit 300, a switch unit 306 for turning on and off the supply of electric power to the electric unit 300 and a gyro sensor 308 for detecting the inclination angle and the angular speed of the vehicle body frame 10 (inverted pendulum type vehicle 1) with respect to a prescribed axial line (such as the plumb vertical line). In particular, the I/O interface unit 305 receives signals from a seat sensor 307 incorporated in the seat unit 170 as well as the signals from the gyro sensor 308 and the switch unit 306.

As shown in FIG. 1, as seen from a side, the front pipe member 12A of the propulsion unit support portion 12 is located in the foremost part of the vehicle body frame 10. The front end of the drive unit support portion 14 which consists of the parts of the right front pipe member 14A and the left front member 14B which are tilted rearward is located behind the foremost end of the front pipe member 12A. The front end of the main wheel 52 of the propulsion unit 50 located below the propulsion unit support portion 12 projects more forward than the foremost end of the front pipe member 12A. In order to cover the vehicle body frame 10 and the propulsion unit 50, the front part of the outer shell 18 is defined by a curved surface that extends smoothly from the upper front end of the drive unit support portion 14 to the front part of the outer periphery of the main wheel 52. As a result, a space 315 is defined between the front end of the vehicle body frame 10 and the front end of the outer shell 18. More specifically, the space 315 extends from the front parts of the right front pipe member 14A and the left front member 14B to the front part of the propulsion unit support portion 12 (or the font pipe member 12A thereof). The electric unit 300 is placed in this space 315.

The electric unit 300 includes a main wheel PDU 301 and a tail wheel PDU 302. The main wheel PDU 301 comprises a microcomputer including a CPU, memory and other devices and a switching circuit for controlling the voltage or current supplied to the electric motors 84 and 92. Likewise, the tail wheel PDU 302 comprises a microcomputer including a CPU, memory and other devices and a switching circuit for controlling the voltage or current supplied to the electric motor 132. The main wheel PDU 301 and the tail wheel PDU 302 receive the signals from the seat sensor 307, the gyro sensor 308 and the switch unit 306 via the I/O unit 305. The main wheel PDU 301 controls the electric motors 92 and 130 according to the signals from the seat sensor 307 and the gyro sensor 308 under an inverted pendulum control principle. The tail wheel PDU 302 controls the tail wheel electric motor 84 according to the signals from the seat sensor 307 and the gyro sensor 308 under a turning control principle.

As shown in FIGS. 1 and 3, the main wheel PDU 301 and the tail wheel PDU 302 are mounted on a same (front) side of an elongated rectangular first circuit board 320. In particular, the main wheel PDU 301 and the tail wheel PDU 302 are arranged one after the other along the lengthwise direction of the first circuit board 32. A cooling fan 321 is provided adjacent to the lengthwise end portion of the first circuit board 320 where the main wheel PDU 301 is located on the first circuit board 320. In the illustrated embodiment, the cooling fan 321 consists of a per se known axial flow fan including a rectangular frame and rotor blades rotatably supported within the frame. The cooling fan 321 is mounted on the first circuit board 320 such that the rotational center line of the fan 321 is in parallel with the lengthwise direction of the first circuit board 320. The main wheel PDU 301 is greater in size than the tail wheel PDU 302, and projects away from the first circuit board 320 more than the tail wheel PDU 302.

As shown in FIG. 4, a bracket 322 consisting of a plate member extends across the front pipe member 12A of the propulsion unit support portion 12 and the front parts of the two side pipe members 12C. The bracket 322 is tilted rearward, and the lower end or the front end thereof is more forwardly located than the front pipe member 12A. A fastening piece 323 is attached to a lower part of each of the right front pipe member 14A and the left front pipe member 14B, and projects toward the other. The first circuit board 320 is attached to the front faces of the bracket 322 and the fastening pieces 323 by using screws or threaded bolts. The first circuit board 320, which is elongated, in the fore and aft direction of the vehicle, supports the tail wheel PDU 302 in a front part thereof and the main wheel PDU 301 in a rear part thereof, and is tilted rearward or has a higher lower end. The front edge of the first circuit board 320 is located somewhat behind the front end of the bracket 322 which is located more forwardly than the first circuit board 320 or the rear wheel PDU 302 supported on the first circuit board 320.

As shown in FIGS. 1 and 3, the DC-DC converter 304, the I/O unit 305 and the switch unit 306 are supported on a same side of a rectangular second circuit board 325 which is attached across the right front pipe member 14A and the left front pipe member 14B in a substantially vertical orientation. The DC-DC converter 304 is located on one end (lower end) of the second circuit board 306, and the I/O unit 305 and the switch unit 306 are located on the other end (upper end) of the second circuit board 325, along the lengthwise direction thereof. The second circuit board 325 is also elongated in the fore and aft (vertical) direction. The DC-DC converter 304 is larger and thicker than the I/O unit 305. A fastening piece 326 is secured to a side of an intermediate point of each of the right front pipe member 14A and the left front pipe member 14B so that the two fastening pieces 326 oppose each other. The second circuit board 325 is attached to the front sides of the fastening pieces 326 and the connecting plate 14H by using screws or threaded bolts. The second circuit board 325 extends vertically, and the major plane thereof faces in the fore and aft direction such that the DC-DC converter 304 is located in a lower part of the front face of the second circuit board 325, the I/O unit 305 is located in the upper left part of the front face thereof, and the switch unit 306 is located in the upper right part of the front face thereof.

The switch unit 306 projects forward, and includes a switch button 328 which extends out of an opening formed in the front part of the outer shell 18. The outer face of the switch button 328 configured to be pushed by the user is directed obliquely upward so as to match the rearward slant on the adjoining outer surface of the outer shell 18, and is provided with an indicator lamp 329 which may consist of LED and lights up when the switch button 328 is turned on. The indicator lamp 329 may be configured to indicate other states of the inverted pendulum type vehicle 1 (such as the occurrence of a failure, the state of the battery, etc.) by blinking at a prescribed interval or emitting light of different colors.

As shown in FIGS. 1 and 2, a first cover 335 is mounted on the front face of the first circuit board 320 so as to cover the tail wheel PDU 301, the main wheel PDU 302 and the cooling fan 321. The first cover 335 is formed with a front opening 336 in a lower part thereof, and a rear opening (not shown in the drawings) defined by an edge thereof surrounding the cooling fan 321. In other words, the tail wheel PDU 301 and the main wheel PDU 302 are located in a space defined by the first circuit board 320 and the first cover 335 so that an air flow admitted from the front opening 336 is passed through this space, and is then expelled by the cooling fan 321 from the rear opening. Preferably, the outer shell 18 is provided with an air communication opening in a part of the outer shell 18 corresponding to the front opening 336 of the first cover 335 to promote an air flow into the front opening 336.

A second cover 338 is attached to the front side of the second circuit board 325 so as to cover the DC-DC converter 304 and the I/O unit 305. The second cover 338 is connected to the outer face of the rear end of the first cover 335 at the lower end thereof. The interior of the second cover 338 is communicated with the interior of the first cover 335 via the cooling fan 321, and the upper end of the second cover 338 is formed with an upper opening 339. In other words, the DC-DC converter 304 and the I/O unit 305 are received in the space defined by the second cover 338 and the second circuit board 325, and this space is positively ventilated by the air introduced by the cooling fan 321 and expelled from the upper opening 339. The switch button 328 of the switch unit 306 is passed through an opening in the second cover 338, and protrudes from the front face of the outer shell 18.

Owing to this arrangement, when the cooling fan 321 is turned, the air inside the outer shell 18 is admitted from the front opening 336 of the first cover 335, and after passing through the interior of the first cover 335, the cooling fan 321 and the interior of the second cover 338, in that order, expelled from the upper opening 339 of the second cover 338. As the air passes through the interior of the first and second covers 335 and 338, heat is removed from the main wheel PDU 301, the tail wheel PDU 302, the DC-DC converter 304, the I/O unit 305 and the switch unit 306. The passage defined by the first cover 335 and the second cover 338 extends obliquely upward so that the air introduced from the front opening 336 in the lower part thereof is heated by the various components, and this promotes an upward flow of the air that eventually flows out of the upper opening 339.

The air expelled from the upper opening 339 of the second cover 338 is guided in a rearward direction along the inner surface of the outer shell 18, and is expelled out of the interior of the outer shell 18 via an air outlet 342 (see FIG. 16) which is formed in an upper end part of the rear side of the outer shell 18. Therefore, the warmed air that has passed through the interior of the first cover 335 and the second cover 338 is prevented from being blown onto the rider. Alternatively, an internal duct or pipe communicating the upper opening 339 with the air outlet 342 may be provided inside the outer shell 18.

The gyro sensor 308 is supported by a bracket 345 (see FIG. 4) extending across the front ends of the right and left fore and aft pipe members 14C, and, as shown in FIG. 1, is located between the right front pipe member 14A and the left front pipe member 14B. More specifically, the gyro sensor 308 is located between the first circuit board 320 and the right drive unit 130 in the fore and aft direction, and between the second circuit board 324 and the main wheel 52 in the vertical direction.

In the electric unit 300 discussed above, the front end of the first cover 335 is located in the foremost position of the electric unit 300, but the front end of the first cover 335 is located behind the plumb line L2 (tangential line) passing the front end of the main wheel 52 (or more particularly, the front end of the foremost one of the driven rollers 54) defining the front end of the propulsion unit 50 as shown in FIG. 1. The main wheel PDU 301, the tail wheel PDU 302, the DC-DC converter 304, the I/O unit 305, the switch unit 306, the first cover 335 and the second cover 338 are located behind an imaginary line connected between the front end of the seat 200 (or the front end of the seat main body 206) and the front end of the bracket 322. Owing to this arrangement, when the inverted pendulum type vehicle 1 has collided with a relatively large object, the object only hits the front end of the seat 200 or the front end of the bracket 322, but not the electric unit 300.

In the illustrated embodiment, the vehicle body frame 10 which supports the two drive units 90 and 130 one above other is provided above the propulsion unit 50 including the main wheel 52. The drive units 90 and 130 have a smaller fore and aft dimension than the main wheel 52, and the outer shell 18 extends smoothly from the upper end of the vehicle body frame 10 to the front end of the main wheel 52, thereby defining a space between the outer shell 18 and the front end of the drive units 90 and 130, and the electric unit 300 is placed in this space which is otherwise wasted. Therefore, the overall size of the inverted pendulum type vehicle 1 can be reduced. The switch button 328 of the switch unit 306 and the indicator lamp 329 are provided on the front side of the outer shell 18 so that the rider seated on the seat 200 can easily operate the switch button 328 and see the indicator lamp 329.

Furthermore, the switch button 328 cannot be easily operated by any one other than the rider of the vehicle 1.

Figure 17:
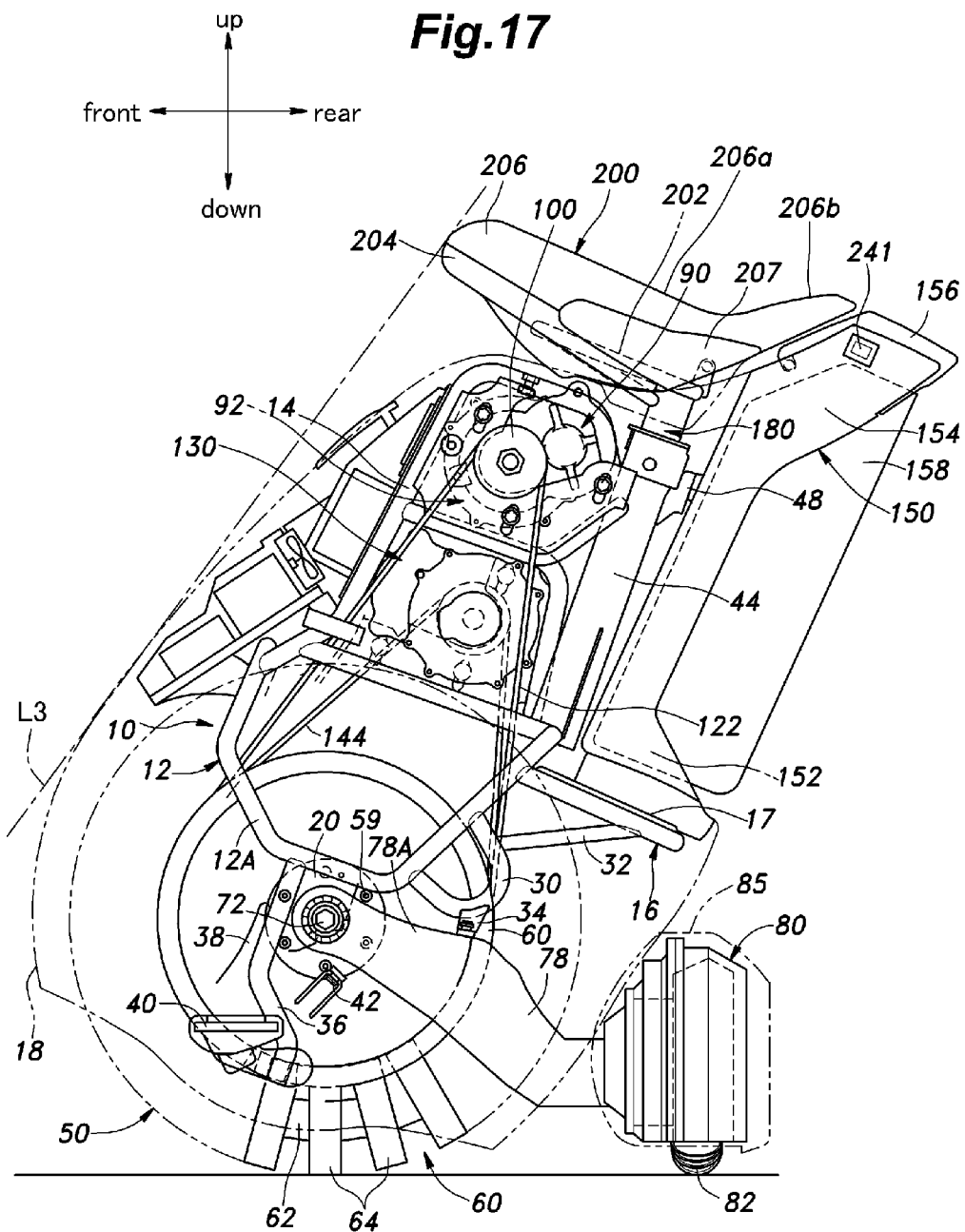
FIG. 17 is a side view of the inverted pendulum type vehicle in a rearwardly tilted position with an outer shell thereof removed.

Referring to FIG. 17, the structure of the inverted pendulum type vehicle 1 related to the mounting of the vehicle and the mode of operation of the vehicle are described in the following. Suppose that the inverted pendulum type vehicle 1 is held upright under the inverted pendulum control without a rider as illustrated in FIG. 1. The rider who wishes to ride the vehicle approaches the vehicle from the rear, and pushes the mount button 241 (see FIG. 17). This deactivates the inverted pendulum control, and causes the vehicle (more particularly the vehicle body frame 10 and the drive units and other components supported thereon to tilt rearward around the hollow axle shaft 54 (see FIG. 2) under the weight of the vehicle until the rearward tilt limiting stopper 34 comes into engagement with the upper surface of the tail wheel arm 78 as shown in FIG. 17. At this time the seat 200, along with the vehicle body frame 10, tilts rearward from the operating position shown in FIG. 1 to a mount position which is lower than the operating position as shown in FIG. 17. As the position of the seat 200 is thus lowered, the rider can easily sit upon the seat 200 from the rear. The rider then operates the mount button 241 to resume the inverted pendulum control. Alternatively, the inverted pendulum control may be initiated by elapsing of a prescribed time period from the time the presence of the rider is detected by the seat sensor 307.

As shown in FIG. 1, the seat main body 206 comprises a main seating portion 206a defining the front end and the middle part of the seating surface and a rear seating portion 206b extending obliquely upward from the rear end of the main seating portion 206a. Owing to the presence this rear seating portion 206b, not only the hip of the rider can be supported in a stable manner but also the rider can easily mount the seat 200 from the rear because the rear seating portion 206b defines a substantially horizontal upper surface when the vehicle is placed in the mount position as illustrated in FIG. 17. The base member 201 supporting the seat main body 206 from below is provided with a main part 201a which extends substantially horizontally so as to correspond to the main seating portion 206a and a rear part 201b which extends obliquely upward from the rear end of the main part 201a so as to correspond to the rear seating portion 206b. Thereby, the load acting on the seating surface can be favorably distributed while the seat main body 206 may be made soft enough to ensure the riding comfort of the rider.

Figure 18:
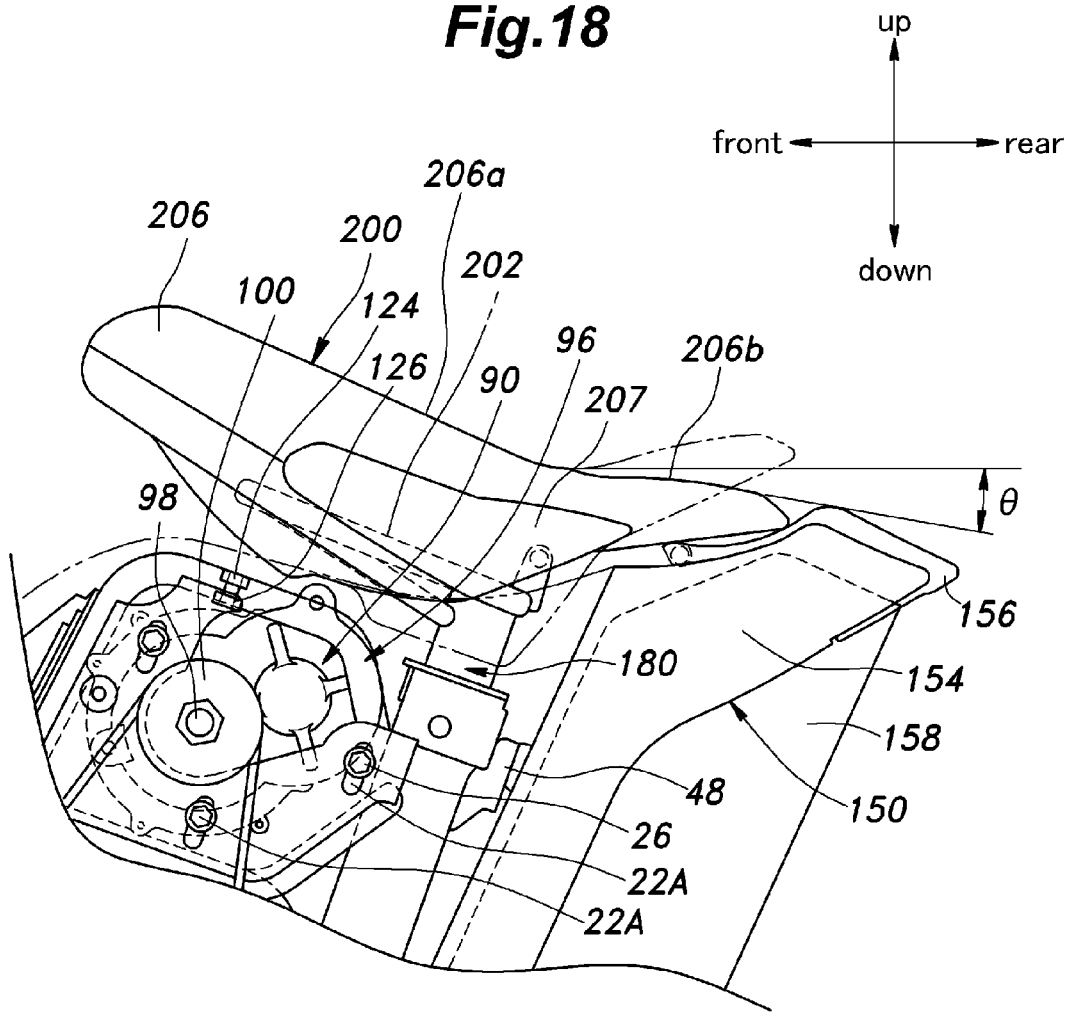
FIG. 18 is a fragmentary side view showing an alternative embodiment of the seat.
Figure 19:
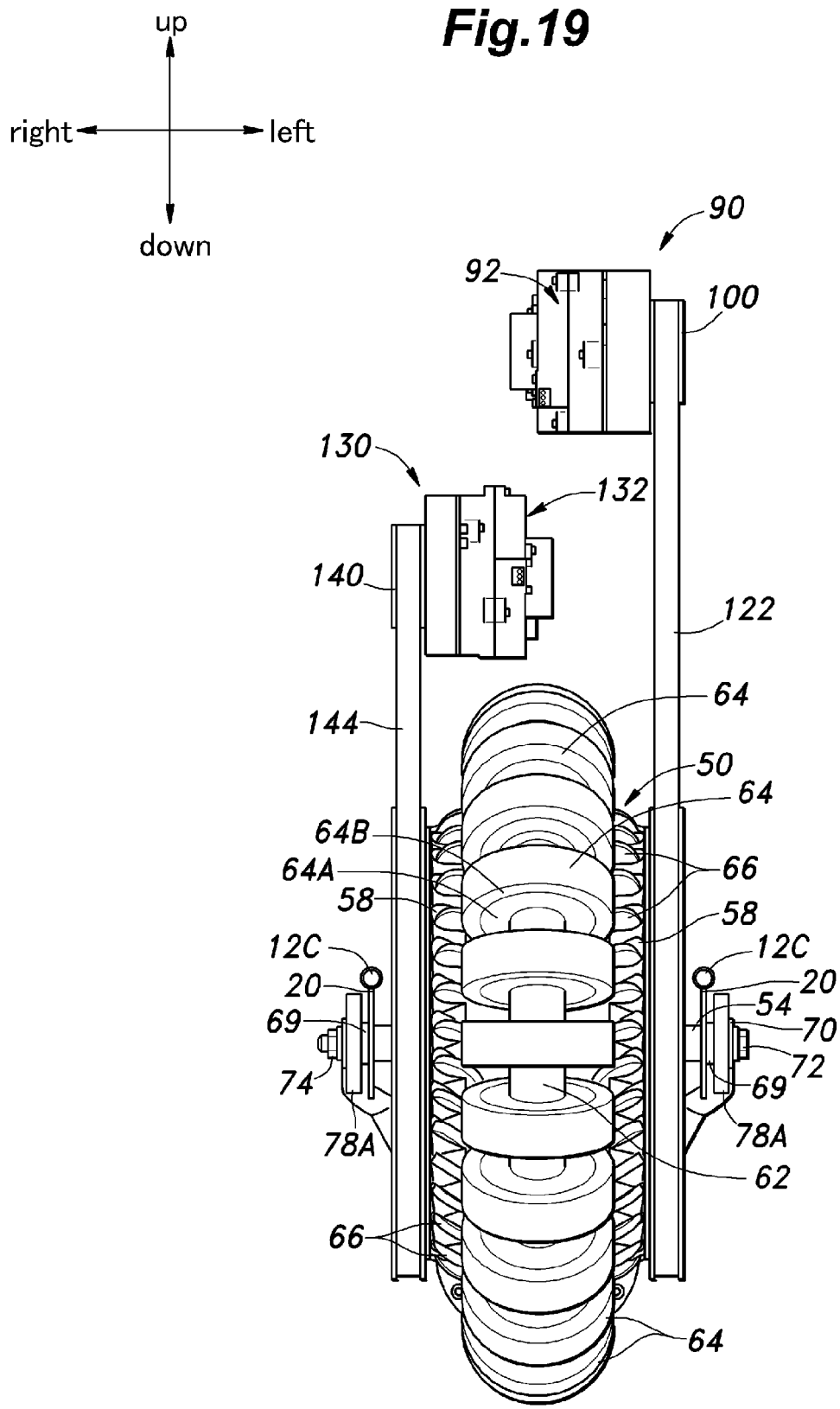
FIG. 19 is a view similar to FIG. 6 showing a modified embodiment of the present invention.

Referring to FIG. 18, the angle of the seating surface in the rearwardly tilted state of the seat 200 may be defined such that the rear seating portion 206b extends substantially horizontally or extends slightly downwardly by an angle 8 (or upwardly by any suitable small angle) as seen from a side. Thereby, the rider is enabled to ride the vehicle more easily.
<Attitude and Travel Control of the Inverted Pendulum Type Vehicle>

The mode of operation of the inverted pendulum type vehicle of the illustrated embodiment is described in the following. The main wheel PDU 301 computes the gravitational center of the inverted pendulum type vehicle 1 as a whole including the rider seated on the seat main body 206 according to the changes in the three-dimensional inclination angle (with respect to the plumb vertical line) and the change rate of the inclination angle of the vehicle body frame 10 measured by the gyro sensor 308.

When the gravitational center of the inverted pendulum type vehicle 1 as a whole including the rider seated on the seat main body 206 is substantially in the neutral position (when the gravitational center and the ground contact point of the main wheel 52 are located on a same plumb vertical line), the main wheel PDU 301 maintains the vehicle body in the same upright position by suitably actuating the electric motors 92 and 132 of the two drive units 90 and 130 according to the inverted pendulum control.

At this time, the tail wheel PDU 302 keeps the electric motor 84 for the tail wheel unit 80 stationary according to a turning control process, and the tail wheel 82 remains stationary as a result.

When the gravitational center of the inverted pendulum type vehicle 1 as a whole including the rider seated on the seat main body 206 has moved forward from the neutral position, the main wheel PDU 301 turns the electric motors 92 and 132 of the two drive units 90 and 130 both in the normal direction at the same speed. (The shifting of the gravitational center of the vehicle can be caused by the leaning forward of the rider.) This causes the two drive units 90 and 130 to be actuated in the normal direction at the same speed so that the main wheel 52 turns in the normal direction around the hollow axle shaft 54. As there is no difference in the rotation speeds of the two drive disks 58, the drive rollers 66 of the drive disks 58 and the driven rollers 64 do not rotate around their individual rotational center lines, and the inverted pendulum type vehicle 1 is propelled in the forward direction. The inverted pendulum type vehicle 1 is thus propelled forward with the vehicle body slightly tilted forward.

When the gravitational center of the inverted pendulum type vehicle 1 as a whole including the rider seated on the seat main body 206 has moved rearward from the neutral position, the main wheel PDU 301 turns the electric motors 92 and 132 of the two drive units 90 and 130 both in the reverse direction at the same speed. (Likewise, the shifting of the gravitational center of the vehicle can be caused by the leaning rearward of the rider.) This causes the two drive units 90 and 130 to be actuated in the reverse direction at the same speed so that the main wheel 52 turns in the reverse direction around the hollow axle shaft 54. Again, as there is no difference in the rotation speeds of the two drive disks 58, the drive rollers 66 of the drive disks 58 and the driven rollers 64 do not rotate around their individual rotational center lines, and the inverted pendulum type vehicle 1 is propelled in the rearward direction. The inverted pendulum type vehicle 1 is thus propelled rearward with the vehicle body slightly tilted rearward.

During such a forward travel or a rearward travel of the vehicle, the tail wheel PDU 302 keeps the electric motor 84 for the tail wheel unit 80 stationary under the turning control. Although the tail wheel 82 engages the road surface while the vehicle travels forward or rearward, because the free rollers of the tail wheel 82 rotate freely around their individual rotational center lines, the tail wheel 82 do not cause any substantial frictional resistance to the movement of the vehicle.

When the gravitational center of the inverted pendulum type vehicle 1 as a whole including the rider seated on the seat main body 206 has moved either leftward or rightward from the neutral position, the main wheel PDU 301 turns the electric motors 92 and 132 of the two drive units 90 and 130 both in mutually opposite directions at the same speed. (Likewise, the shifting of the gravitational center of the vehicle can be caused by the leaning either leftward or rightward of the rider.) This causes the two drive units 90 and 130 to be actuated in the opposite directions at the same speed so that the drive rollers 66 on the drive disks 58 apply tangential forces to the driven rollers 64 so that the driven rollers 64 are caused to rotate around their individual rotational center lines (around the tangential line of the main wheel 52 at the point where the particular driven roller 64 is located) while the main wheel 52 is prevented from rotating around the hollow axle shaft 54. As a result, the inverted pendulum type vehicle 1 travels sideways while the vehicle is directed straight ahead.

The rotation of the main wheel 52 and the rotation of the driven rollers 64 are determined by the difference between the rotational speeds of the two drive disks 58. When the two drive disks 58 are rotated in the opposite directions at the same speed, there is no rotation of the main wheel 52, and only the drive rollers 64 rotate around their individual rotational center lines. As a result, the inverted pendulum type vehicle 1 travels sideways. When the two drive disks 58 rotate either in the same direction or in different directions at mutually different speeds, the vehicle is caused to travel in an oblique direction determined by the combination of the rotation of the main wheel 52 around the hollow axle shaft 54 and the rotation of the drive rollers 64 around their individual rotational center lines.

When the vehicle is traveling in any direction other than the straight ahead and straight back, the tail wheel PDU 302 drives the electric motor 84 for the tail wheel unit 80 at such a speed that the tail wheel 82 rotates at a speed corresponding to the lateral travel speed of the vehicle. Thereby, the tail wheel 82 applies a minimum resistance to the propulsion of the vehicle in that particular direction although the tail wheel 82 engages the road surface. When the tail wheel 82 is turned at a speed not corresponding to the lateral travel speed of the vehicle, the tails wheel 82 applies a yaw moment to the vehicle, and thereby causes the vehicle to turn (corner) or the vehicle to head in a different direction.

The present invention has been described in terms of a specific embodiment, but the present invention is not limited by the illustrated embodiments, and can be changed in various parts thereof without departing from the spirit of the present invention. For instance, the main wheel 52 is required to have a plurality of driven rollers 64 combined into an annular shape, and it does not necessarily requires an annular member to support these driven rollers 64. It is also possible to use a disk member having a corresponding number of pivots along the periphery thereof to support the driven rollers 64 in an annular arrangement. The tail wheel 62 may be replaced by a normal wheel when no yaw movement is required or when a small frictional resistance is acceptable. It is even possible to totally omit the tail wheel 62.

Further, the radially projecting part 102A of the reduction gear unit 96 of the left drive unit 90 may project rearwardly while the radially projecting part 142A of the reduction gear unit 136 of the right drive unit 130, contrary to the illustrated embodiment, without departing from the spirit of the present invention. The cutouts 22B and 24B of the left drive unit mounting plate 22 and the right drive unit mounting plate 24 may be replaced by openings that allow the reduction gear unit output shafts 98 and 138 to pass through. Also, the particular type of the reduction gear units 96 and 136 in the illustrated embodiment is only exemplary, and any types of reduction gear units can be used without departing from the spirit of the present invention. It is even possible to omit the use of the reduction gear units 96 and 136 depending on the type of electric motors that are to be used.

The invention claimed is:

1. An inverted pendulum type vehicle, comprising:
 a vehicle body frame extending in a vertical direction;
 a propulsion unit mounted in a lower part of the vehicle body frame and including a main wheel configured to be actuated by an inverted pendulum control;
 a drive unit mounted in a vertically intermediate part of the vehicle body and configured to actuate the main wheel;
 a seat mounted on an upper part of the vehicle body frame;
 a battery case mounted on the vehicle frame behind the drive unit, and having an access opening extending at least in an upper end thereof;
 a battery configured to be received in the battery case; and
 a lid pivotally supported by the battery case so as to be moveable between an open position exposing the access opening and a closed position closing at least an upper part of the access opening and engaging a part of the battery,
 wherein the battery case includes an engagement portion provided in a bottom wall thereof and a bottom end of the battery includes a corresponding engagement portion configured to cooperate with the engagement portion of the battery case whereby the battery is prevented from lateral movement.

2. The inverted pendulum type vehicle according to claim 1, wherein the lid includes an engagement portion provided in an inner surface thereof and a top end of the battery includes a corresponding engagement portion configured to cooperate with the engagement portion of the lid when the lid is in the closed position whereby the battery is prevented from lateral movement.

3. The inverted pendulum type vehicle according to claim 2, wherein one of the engagement portions comprises a recess and the other of the engagement portions comprises a projection configured to be fitted into the recess when the battery is placed in the battery case and the lid is in the closed position.

4. The inverted pendulum type vehicle according to claim 2, wherein the lid is provided with a latch that cooperates with a corresponding latch catch provided in an upper end of the battery for selectively holding the lid in the closed position.

5. The inverted pendulum type vehicle according to claim 1, wherein the lid is connected to an upper part of the battery case adjacent to a forward end of the opening thereof via a hinge having a hinge axis extending in a lateral direction.

6. The inverted pendulum type vehicle according to claim 1, wherein the access opening extends from the upper end of the battery case to at least a vertically middle part of a rear end of the battery case.

7. The inverted pendulum type vehicle according to claim 6, wherein the access opening extends from the upper end of the battery case to a lower part of the rear end of the battery case.

8. An inverted pendulum type vehicle, comprising:
 a vehicle body frame extending in a vertical direction;
 a propulsion unit mounted in a lower part of the vehicle body frame and including a main wheel configured to be actuated by an inverted pendulum control;
 a drive unit mounted in a vertically intermediate part of the vehicle body and configured to actuate the main wheel;
 a seat mounted on an upper part of the vehicle body frame;
 a battery case mounted on the vehicle frame behind the drive unit, and having an access opening extending at least in an upper end thereof;
 a battery configured to be received in the battery case; and
 a lid pivotally supported by the battery case so as to be moveable between an open position exposing the access opening and a closed position closing at least an upper part of the access opening and engaging a part of the battery,
 wherein the battery case is configured such that the battery is tilted rearward when the battery is fully received in the battery case, and
 wherein the battery is vertically elongated.

9. An inverted pendulum type vehicle, comprising:
 a vehicle body frame extending in a vertical direction;

a propulsion unit mounted in a lower part of the vehicle body frame and including a main wheel configured to be actuated by an inverted pendulum control;
a drive unit mounted in a vertically intermediate part of the vehicle body and configured to actuate the main wheel;
a seat mounted on an upper part of the vehicle body frame;
a battery case mounted on the vehicle frame behind the drive unit, and having an access opening extending at least in an upper end thereof;
a battery configured to be received in the battery case; and
a lid pivotally supported by the battery case so as to be moveable between an open position exposing the access opening and a closed position closing at least an upper part of the access opening and engaging a part of the battery,
wherein the seat is moveable between a lower operating position and an upper non-operating position, and the seat is located so as to prevent the lid from moving from the closed position when the seat is in the lower operating position and allow the lid to move to the open position when the seat is in the upper non-operating position.

* * * * *